(12) United States Patent
Mitchell et al.

(10) Patent No.: US 10,248,008 B2
(45) Date of Patent: Apr. 2, 2019

(54) REMOVABLE HINGE

(71) Applicant: Avigilon Corporation, Vancouver (CA)

(72) Inventors: Ross Allen Mitchell, Surrey (CA); Sudeep Mohan, Surrey (CA)

(73) Assignee: Avigilon Corporation, Vancouver (CA)

( * ) Notice: Subject to any disclaimer, the term of this patent is extended or adjusted under 35 U.S.C. 154(b) by 3 days.

(21) Appl. No.: 15/405,907

(22) Filed: Jan. 13, 2017

(65) Prior Publication Data

US 2017/0205687 A1 Jul. 20, 2017

Related U.S. Application Data

(60) Provisional application No. 62/278,882, filed on Jan. 14, 2016.

(51) Int. Cl.
| | | |
|---|---|---|
| *G03B 17/56* | (2006.01) |
| *F16C 11/04* | (2006.01) |
| *F16M 13/02* | (2006.01) |
| *F16M 11/10* | (2006.01) |
| *F16M 11/16* | (2006.01) |
| *F16M 11/20* | (2006.01) |

(52) U.S. Cl.
CPC ............ *G03B 17/561* (2013.01); *F16C 11/04* (2013.01); *F16M 11/105* (2013.01); *F16M 11/16* (2013.01); *F16M 11/2057* (2013.01); *F16M 13/02* (2013.01)

(58) Field of Classification Search
CPC ...... F16C 11/04; F16C 11/045; G03B 17/561; F16M 13/02; E05D 7/04
See application file for complete search history.

(56) References Cited

U.S. PATENT DOCUMENTS

| | | | | |
|---|---|---|---|---|
| 4,368,506 A | * | 1/1983 | Rapp ...................... F21V 21/03 362/147 |
| 4,414,576 A | * | 11/1983 | Randmae ......... G08B 13/19619 219/201 |
| 5,790,910 A | | 8/1998 | Haskin |
| 5,929,910 A | | 7/1999 | Kim et al. |
| 6,008,846 A | | 12/1999 | Uehara et al. |
| 6,678,001 B1 | * | 1/2004 | Elberbaum ...... G08B 13/19619 348/373 |
| 7,585,084 B2 | * | 9/2009 | Kinnune ................. F21V 21/03 362/147 |
| 7,599,000 B2 | | 10/2009 | Lai |
| 7,611,255 B1 | * | 11/2009 | Lagassey ............... A42B 1/244 362/103 |
| 7,927,027 B2 | | 4/2011 | Yamakose et al. |
| 8,589,963 B2 | * | 11/2013 | Wang ................... G11B 33/027 720/647 |
| 8,998,512 B1 | | 4/2015 | Celler |

(Continued)

*Primary Examiner* — Clayton E. LaBalle
*Assistant Examiner* — Linda B Smith
(74) *Attorney, Agent, or Firm* — Daniel Hammond

(57) ABSTRACT

A removable hinge for connecting a plate to a bracket. The bracket has a hook slot which has an open end and a retaining end. A hook on the plate fits into the open end of the hook slot and slides along the hook slot to the retaining end. When the plate is in a hanging position, the hook is at the retaining end of the hook slot. The plate is removable from the bracket by sliding the hook from the hook slot out of the open end. The removable hinge may be advantageously use in coupling a camera assembly, such as a bullet camera, to a bracket mounted on a wall or ceiling.

18 Claims, 23 Drawing Sheets

(56) References Cited

U.S. PATENT DOCUMENTS

| | | | |
|---|---|---|---|
| 9,062,869 B2* | 6/2015 | Lay | F21V 21/03 |
| 9,250,500 B2 | 2/2016 | Celler | |
| 9,840,177 B2* | 12/2017 | Nagayama | B60N 3/023 |
| 2005/0000747 A1* | 1/2005 | Richlen | B62J 99/00 |
| | | | 180/219 |
| 2006/0083007 A1* | 4/2006 | Haugaard | F21S 8/033 |
| | | | 362/382 |
| 2006/0147189 A1* | 7/2006 | Yogesan | A61B 3/12 |
| | | | 396/18 |
| 2008/0226282 A1 | 9/2008 | Takahashi | |
| 2009/0002548 A1 | 1/2009 | Liang et al. | |
| 2009/0314915 A1* | 12/2009 | Tu | F16M 11/10 |
| | | | 248/398 |
| 2011/0102587 A1 | 5/2011 | Zittel | |
| 2017/0205027 A1* | 7/2017 | Mitchell | F16M 13/02 |

* cited by examiner

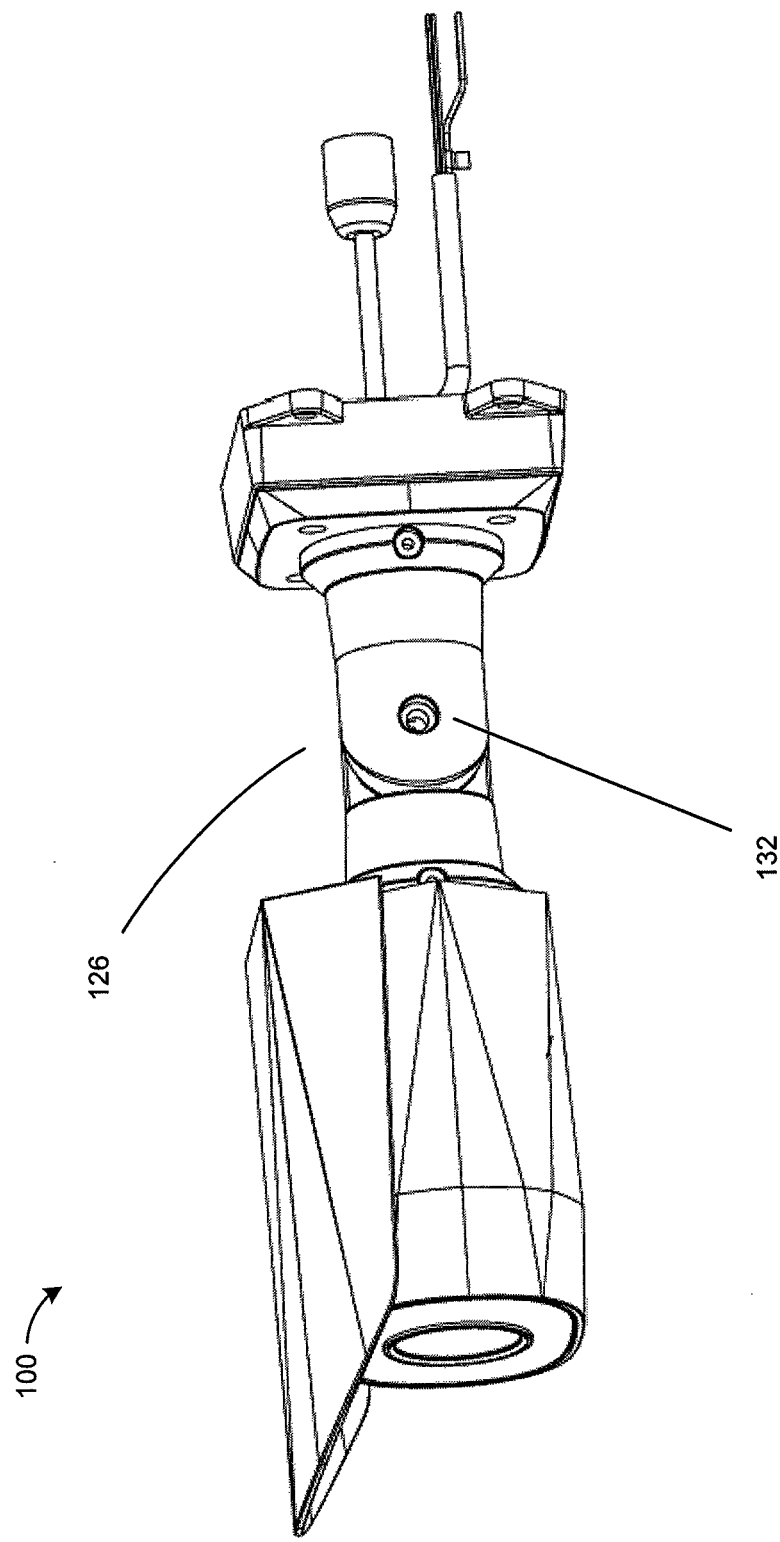

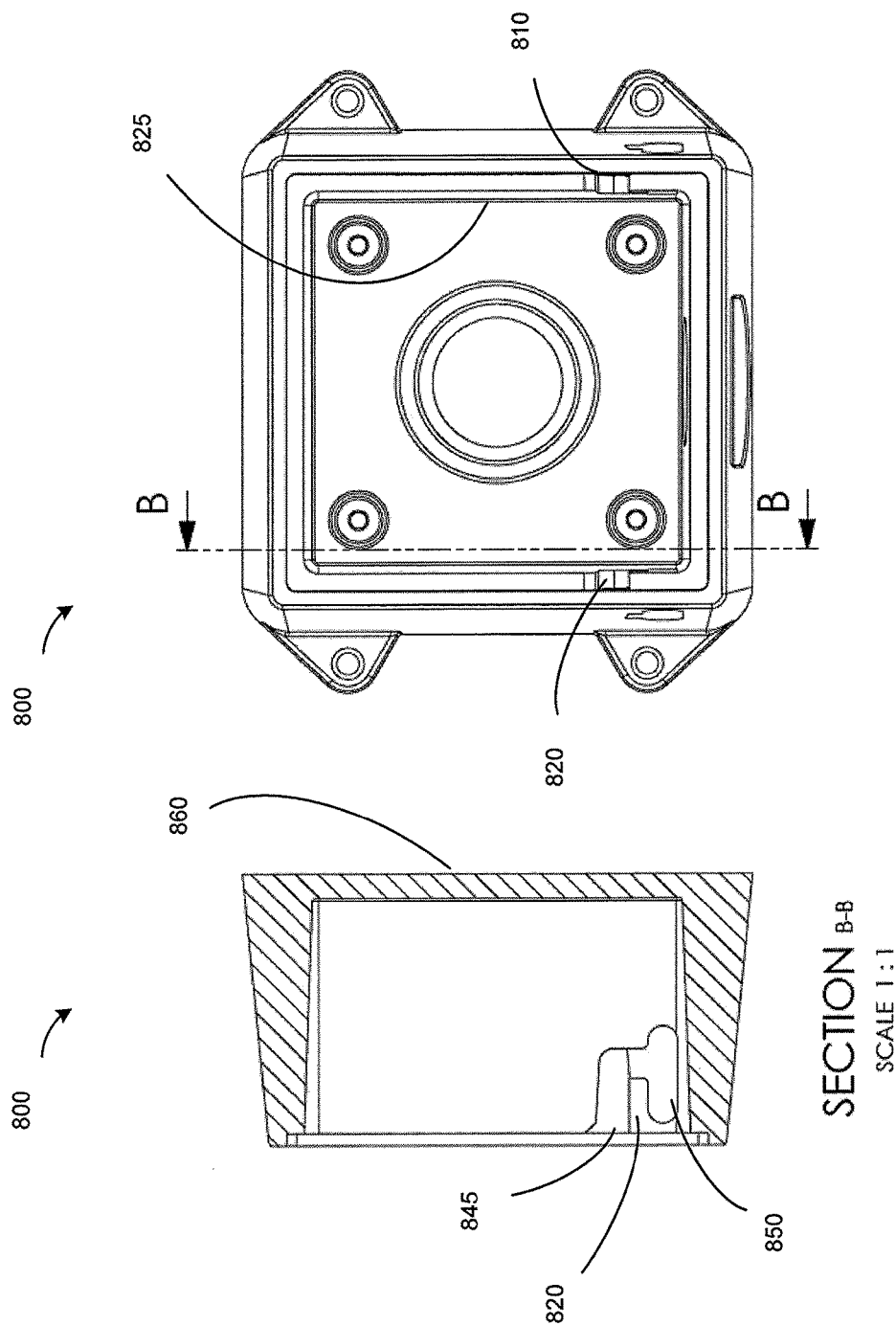

REMOVABLE HINGE

CROSS REFERENCE TO RELATED APPLICATION

This application claims the benefit of U.S. Provisional Application Ser. No. 62/278,882, entitled REMOVABLE HINGE, filed on Jan. 14, 2016, which application is incorporated by reference herein.

TECHNICAL FIELD

The present disclosure is directed at a removable hinge and a camera assembly comprising the removable hinge.

BACKGROUND

A surveillance camera is typically positioned so that it is able to record actions occurring in a region of interest. These cameras are typically installed on a wall or a ceiling of a building. The manner of installation may vary with the type of camera and the nature of the installation. For example, the installation of a bullet camera that is mounted flush against a ceiling may be different from a bullet style camera that is installed against a wall due to, for example, the differences in supporting the camera assembly near the mounting bracket while the electrical connections are made. Regardless of the nature of the installation or type of camera, the camera's position is typically adjusted by a technician when installing the camera and from time to time during the life of the camera.

During the installation of bullet style cameras, the installers have to simultaneously hold the camera and make electrical connections. These cameras are typically installed on top of poles or some distance above the ground so that the use of a ladder is normally required. Since electrical connections are most easily made with the use of two hands, holding the camera and making connections while balancing on a ladder is both time consuming and awkward. The potential to damage the camera increases when installers are required to hold a moderately heavy camera for an extended time during the connection process.

Manufacturers have historically used lanyards to suspend cameras from mounting surfaces during the connection process. Using lanyards can require attaching the lanyard to the mount, involves additional parts and expense, and allows the camera to swing freely when suspended. Cameras that dangle from lanyards are prone to getting damaged during install.

SUMMARY

According to a first aspect, there is provided a removable hinge for connecting a plate to a bracket comprising a first hook slot on a first inside of the bracket and a second hook slot on a second inside of the bracket where the first inside is opposite to the second inside, and the first hook slot and the second hook slot each having an open end and a retaining end; and a first hook on one side of the plate and a second hook on opposite side of the plate where the first hook fits into the open end of the first hook slot and the second hook fits into the open end of the second hook slot, and the first hook slides along the first hook slot to the retaining end and the second hook slides along the second hook slot to the retaining end; wherein the first hook and the second hook are positioned on the plate such that the first hook and the second hook are retained in the first hook slot and the second hook slot, wherein the plate is in a hanging position when the first hook is at the retaining end of the first hook slot and the second hook is at the retaining end of the second hook slot, and wherein the plate is removable from the bracket by sliding the first hook from the first hook slot out of the open end and the second hook from the second hook slot out of the open end.

The first hook slot may have a U shaped slot with the open end at one end and the retaining end at the other end and wherein the second hook slot may have a U shaped slot with the open end at one end and the retaining end at the other end, and wherein the hook slots are integrated into walls of the bracket. The first hook may comprises a first pivot pin and the second hook comprises a second pivot pin, the first pivot pin and the second pivot pin in the first hook slot and the second hook slot are aligned along an axis such that the plate is hinged to the bracket. The removable hinge may have a stop to limit the plate, hinged to the bracket, from opening beyond a predetermined angle. The plate and the bracket may be one of square shaped, rectangular shaped, hexagon shaped, oval shaped and irregular shaped. The plate and the bracket may be locked in a hanging position.

According to another aspect, there is provided a camera assembly comprising a device housing for housing electronic devices; a device section coupled to the device housing; a mounting section coupled to the device section; a mounting plate coupled to the mounting section; and a bracket coupled the mounting plate over a removable hinge; wherein the removable hinge comprising a first hook slot on a first inside of the bracket and a second hook slot on a second inside of the bracket where the first inside is opposite to the second inside, and the first hook slot and the second hook slot each having an open end and a retaining end; and a first hook on one side of the plate and a second hook on opposite side of the plate where the first hook fits into the open end of the first hook slot and the second hook fits into the open end of the second hook slot, and the first hook slides along the first hook slot to the retaining end and the second hook slides along the second hook slot to the retaining end; wherein the first hook and the second hook are positioned on the plate such that the first hook and the second hook are retained in the first hook slot and the second hook slot, wherein the plate is in a hanging position when the first hook is at the retaining end of the first hook slot and the second hook is at the retaining end of the second hook slot, and wherein the plate is removable from the bracket by sliding the first hook from the first hook slot out of the open end and the second hook from the second hook slot out of the open end.

The camera assembly may have the first hook slot with a U shaped slot with the open end at one end and the retaining end at the other end and wherein the second hook slot may have a U shaped slot with the open end at one end and the retaining end at the other end, and wherein the hook slots are integrated into walls of the bracket. The first hook may comprises a first pivot pin and the second hook comprises a second pivot pin, the first pivot pin and the second pivot pin in the first hook slot and the second hook slot are aligned along an axis such that the plate is hinged to the bracket. The removable hinge may have a stop to limit the plate, hinged to the bracket, from opening beyond a predetermined angle. The plate and the bracket may be one of square shaped, rectangular shaped, hexagon shaped, oval shaped and irregular shaped. The plate and the bracket may be locked in a hanging position.

According to another aspect, there is provided a removable hinge for connecting a plate to a bracket comprising a first hook slot on a first inside of the plate and a second hook slot on a second inside of the plate where the first inside is opposite to the second inside, and the first hook slot and the second hook slot each having an open end and a retaining end; and a first hook on one side of the bracket and a second hook on opposite side of the bracket where the first hook fits into the open end of the first hook slot and the second hook fits into the open end of the second hook slot, and the first hook slides along the first hook slot to the retaining end and the second hook slides along the second hook slot to the retaining end; wherein the first hook and the second hook are positioned on the bracket such that the first hook and the second hook are retained in the first hook slot and the second hook slot, wherein the bracket is in a hanging position when the first hook is at the retaining end of the first hook slot and the second hook is at the retaining end of the second hook slot, and wherein the bracket is removable from the plate by sliding the first hook from the first hook slot out of the open end and the second hook from the second hook slot out of the open end.

The first hook slot may have a U shaped slot with the open end at one end and the retaining end at the other end and wherein the second hook slot may have a U shaped slot with the open end at one end and the retaining end at the other end, and wherein the hook slots are integrated into walls of the bracket. The first hook may comprise a first pivot pin and the second hook may comprise a second pivot pin, the first pivot pin and the second pivot pin in the first hook slot and the second hook slot are aligned along an axis such that the plate is hinged to the bracket. The removable hinge may further comprise a stop to limit the plate, hinged to the bracket, from opening beyond a predetermined angle. The plate and the bracket may be one of square shaped, rectangular shaped, hexagon shaped, oval shaped and irregular shaped. The plate and the bracket may be locked in the hanging position.

According to another aspect, there is provided a camera assembly comprising a device housing for housing electronic devices; a device section coupled to the device housing; a mounting section coupled to the device section; a mounting plate coupled to the mounting section; and a bracket coupled the mounting plate over a removable hinge; wherein the removable hinge comprising a first hook slot on a first inside of the plate and a second hook slot on a second inside of the plate where the first inside is opposite to the second inside, and the first hook slot and the second hook slot each having an open end and a retaining end; and a first hook on one side of the bracket and a second hook on opposite side of the bracket where the first hook fits into the open end of the first hook slot and the second hook fits into the open end of the second hook slot, and the first hook slides along the first hook slot to the retaining end and the second hook slides along the second hook slot to the retaining end; wherein the first hook and the second hook are positioned on the bracket such that the first hook and the second hook are retained in the first hook slot and the second hook slot, wherein the bracket is in a hanging position when the first hook is at the retaining end of the first hook slot and the second hook is at the retaining end of the second hook slot, and wherein the bracket is removable from the plate by sliding the first hook from the first hook slot out of the open end and the second hook from the second hook slot out of the open end.

The first hook slot may have a U shaped slot with the open end at one end and the retaining end at the other end and wherein the second hook slot may have a U shaped slot with the open end at one end and the retaining end at the other end, and wherein the hook slots are integrated into walls of the bracket. The first hook may comprise a first pivot pin and the second hook may comprise a second pivot pin, the first pivot pin and the second pivot pin in the first hook slot and the second hook slot are aligned along an axis such that the plate is hinged to the bracket. The removable hinge may further comprise a stop to limit the plate, hinged to the bracket, from opening beyond a predetermined angle. The plate and the bracket may be one of square shaped, rectangular shaped, hexagon shaped, oval shaped and irregular shaped. The plate and the bracket may be locked in the hanging position.

According to another aspect, there is provided a removable hinge for connecting a plate to a bracket comprising a hook slot on the bracket, the hook slot having an open end and a retaining end; and a hook on the plate where the hook fits into the open end of the first hook slot and the hook slides along the first hook slot to the retaining end; wherein the plate is in a hanging position when the hook is at the retaining end of the hook slot, and wherein the plate is removable from the bracket by sliding the hook from the hook slot out of the open end.

The hook slot may have a U shaped slot with the open end at one end and the retaining end at the other end, and wherein the hook slot is integrated into a wall of the bracket. The hook may comprise a pivot pin, the pivot pin in the retaining end of the hook slot hinges the plate to the bracket. The removable hinge may further comprise a stop to limit the plate, hinged to the bracket, from opening beyond a predetermined angle. The plate and the bracket may be one of square shaped, rectangular shaped, hexagon shaped, oval shaped and irregular shaped. The plate and the bracket may be locked in the hanging position.

According to another aspect, there is provided a camera assembly comprising a device housing for housing electronic devices; a device section coupled to the device housing; a mounting section coupled to the device section; a mounting plate coupled to the mounting section; and a bracket coupled the mounting plate over a removable hinge; wherein the removable hinge comprising a hook slot on the bracket, the hook slot having an open end and a retaining end; and a hook on the plate where the hook fits into the open end of the first hook slot and the hook slides along the first hook slot to the retaining end; wherein the plate is in a hanging position when the hook is at the retaining end of the hook slot, and wherein the plate is removable from the bracket by sliding the hook from the hook slot out of the open end.

The hook slot may have a U shaped slot with the open end at one end and the retaining end at the other end, and wherein the hook slot is integrated into a wall of the bracket. The hook may comprise a pivot pin, the pivot pin in the retaining end of the hook slot hinges the plate to the bracket. The removable hinge may further comprise a stop to limit the plate, hinged to the bracket, from opening beyond a predetermined angle. The plate and the bracket may be one of square shaped, rectangular shaped, hexagon shaped, oval shaped and irregular shaped. The plate and the bracket may be locked in the hanging position.

BRIEF DESCRIPTION OF THE DRAWINGS

In the accompanying drawings, which illustrate one or more example embodiments:

FIG. 1 B is an exploded view of the parts of the camera assembly.

FIG. 1 C is a side sectional view of the camera assembly.

FIG. 1 D is a top section view of the camera assembly.

FIG. 2 B are side views and sectional views of the device section and the mounting section.

FIG. 3 B is a side view of the device plate.

FIG. 8 B is a top view of the junction box with section B-B line.

FIG. 8 C is a sectional view of the junction box.

FIG. 8 D is a left perspective view of the junction box.

DETAILED DESCRIPTION

Figure 1B:
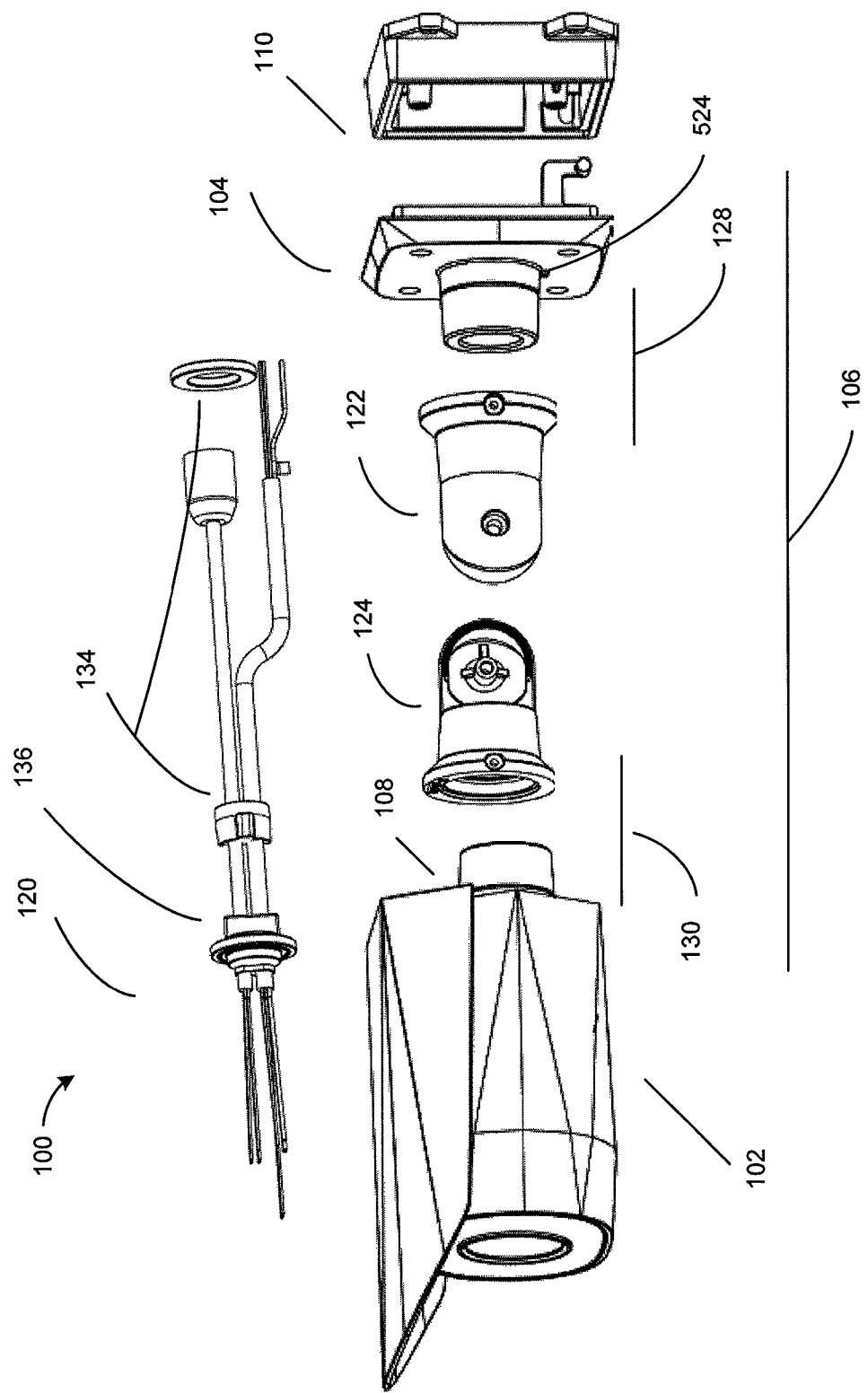
FIG. 1 A is perspective view of a camera assembly with a mounting bracket according to one embodiment.
Figure 1C:
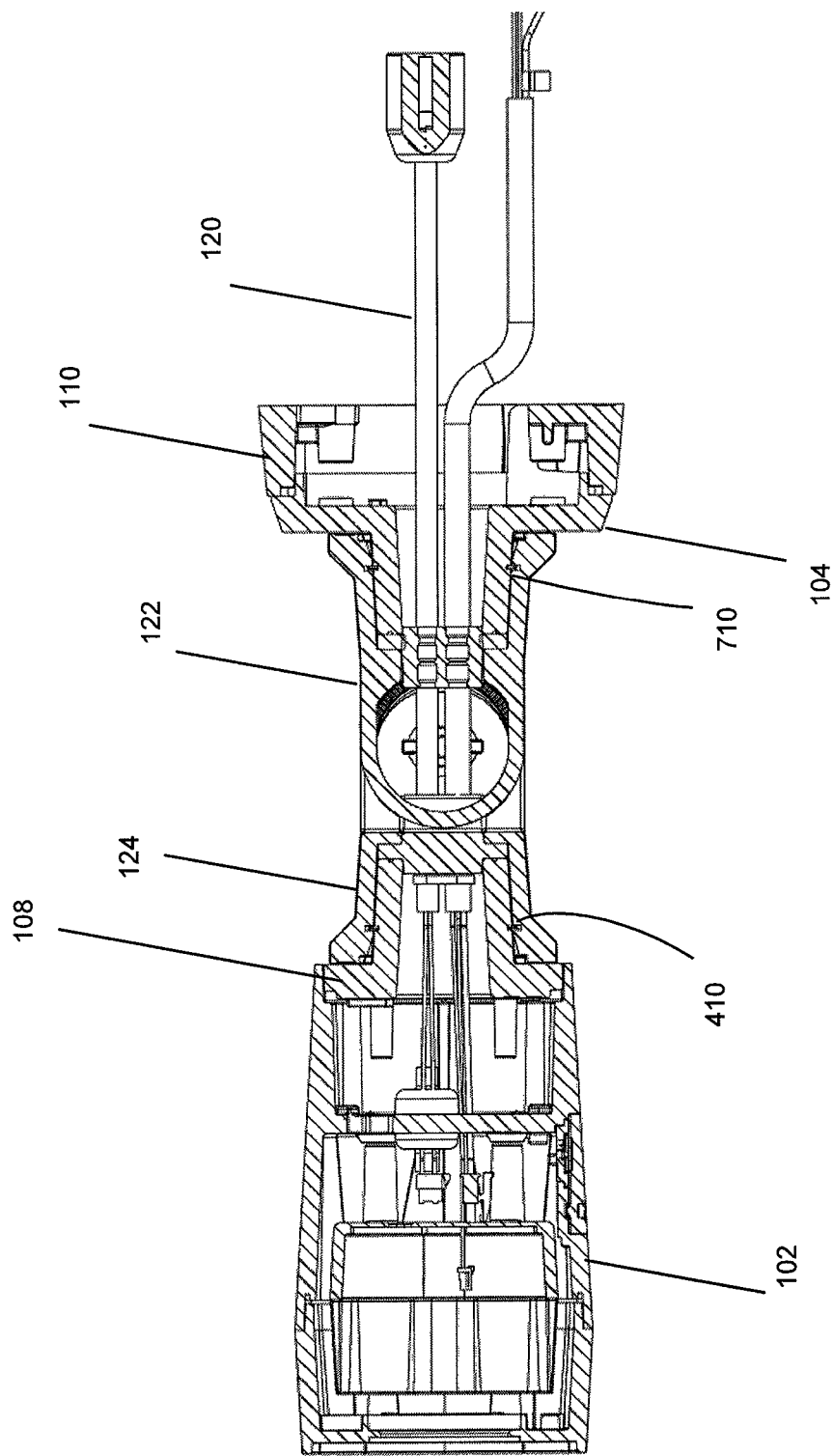

Directional terms such as "top", "side", "right", "left", "front", and "back" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description is intended to include indirect and direct connections unless otherwise indicated. For example, if a first component is coupled to a second component, that coupling may be through a direct connection or through an indirect connection via other components and connections. Similarly, if the first component is communicatively coupled to the second component, communication may be through a direct connection or through an indirect connection via other components and connections.

The terms annular, cylindrical, ring, and other such terms are intended to be read with the adjective "substantially" so as not to limit their scope.

While the embodiments herein describe a camera assembly for mounting a camera having device housing, it will be understood that the embodiments herein are also applicable to a sensor assembly for mounting a sensor having a device housing. The sensor may include one or more of audio, motion, lighting sensing capabilities. Embodiments herein and are further applicable to an electronic device assembly for mounting an electronic device having a device housing.

One way in which to mount a camera, such as a bullet camera, to a mounting surface such as a ceiling or a wall is to attach the camera to a mounting arm and to then attach the mounting arm to the mounting surface. If the mounting arm is an articulating mounting arm (hereinafter simply an "articulating arm") that has at least one degree of freedom, as in the embodiments described herein, the arm can facilitate positioning the camera at a region of interest.

More particularly, the embodiments described herein are directed at a camera assembly that comprises a device housing, a device plate, an articulating arm, and a mounting plate used to mount the camera assembly to a mounting surface. The articulating arm comprises multiple sections coupled together at joints, wherein a first end of a first of the sections is coupled to the mounting plate and a second end of a second of the sections is coupled to the device housing, each of the joints couples one of the sections to an immediately preceding one of the sections, and at least one of the joints is movable. The articulating arm is accordingly coupled together in series: an end of any one of the sections is connected to an end of the immediately following section. Interiors of the sections collectively comprise a wiring conduit extending through the interior of the articulating arm permitting wire to pass from the device housing to the mounting plate while entirely contained within, and accordingly protected by, the articulating arm.

The components described herein may be made of metal, plastic, and any other relatively rigid material. The embodiments described below are made of metal.

FIGS. 1A, 1B, 1C and 1 D respectively show perspective, exploded, top sectional and side sectional views of a camera assembly 100 comprising a device housing 102, and an articulating arm 106 that connects the device housing 102 to a mounting bracket (or bracket) 110 for mounting the camera assembly to a surface (e.g. wall or ceiling), and a wiring harness 120 for connecting a sensor such as a camera to electrical power sources and control centers. The screws were not depicted in FIGS. 1 C and 1 D.

The depicted articulating arm 106 comprises a device plate 108, a mounting plate 104, and two sections: a first section that is a mounting section 122, and a second section that is a device section 124, which are hinge coupled together at a hinge joint 126. In the camera assembly 100, the end of the mounting section 122 opposite the hinge joint 126 (i.e., the end in proximity to the mounting plate 104) is connected to the mounting plate 104 using a mounting swivel joint 128 (a movable joint). Analogously, the end of the device section 124 opposite the hinge joint 126 (i.e., the end in proximity to the device plate 108) is connected to the device plate 108 using a device swivel joint 130. The terms mounting and device are for reference and are not intended to suggest any limitations.

The interiors of the sections and the plates collectively comprise a wiring conduit extending through the interior of the articulating arm 106 permitting the wiring harness 120 to pass through the device plate 108 and out of the mounting plate 104 while entirely contained within the articulating 106. The wiring harness 120 further has a device grommet 136 and a mounting grommet 134 of a shape, which are locked in motion with the sections 122, 124, to resist wiring being twisted across the hinged joint 126 as the two swivel joints 126, 128 are rotated. The grommets 136, 134 also have notches to increase the resistance against the wiring twisting across the hinged joint 126.

The grommet 134 is a 2 part grommet composed of a main body and a sealing washer. Together they form a mechanical structure similar to the grommet 134 when assembled except the grommet 134 is sized to allow passage of the wiring harness 120 through the sections 122, 124 and the plates 104, 108 as needed before the sealing washer is installed.

According to another embodiment, the device plate 108 is integrated with the device housing 102. The device housing 102 comprising a stud. Analogously, in another embodiment, the mounting plate 104 is integrated with the bracket 110. The bracket 110 comprising a stud.

The mounting and device swivel joints 128,130 are discussed in more detail below together with FIGS. 2A-2 B, 3 A, 3 B, 4 and 5. Although the depicted embodiment shows the articulating arm 106 movably coupled to the device housing 102 and the bracket 110 using movable joints, in alternative embodiments the articulating arm 106 is fixedly coupled to the device housing 102, but movably coupled through the mounting plate 104 to the Bracket 110. Further, the depicted embodiment shows the articulating arm 106 having the mounting section 122 and the device section 124 coupled to the mounting plate 104 and the device plate 108 respectively. The mounting section 122 and the device section 124 may instead be coupled to the device plate 108 and the mounting plate 104 respectively. The terms mounting and device are for reference and are not intended to suggest any limitations.

Figure 2:
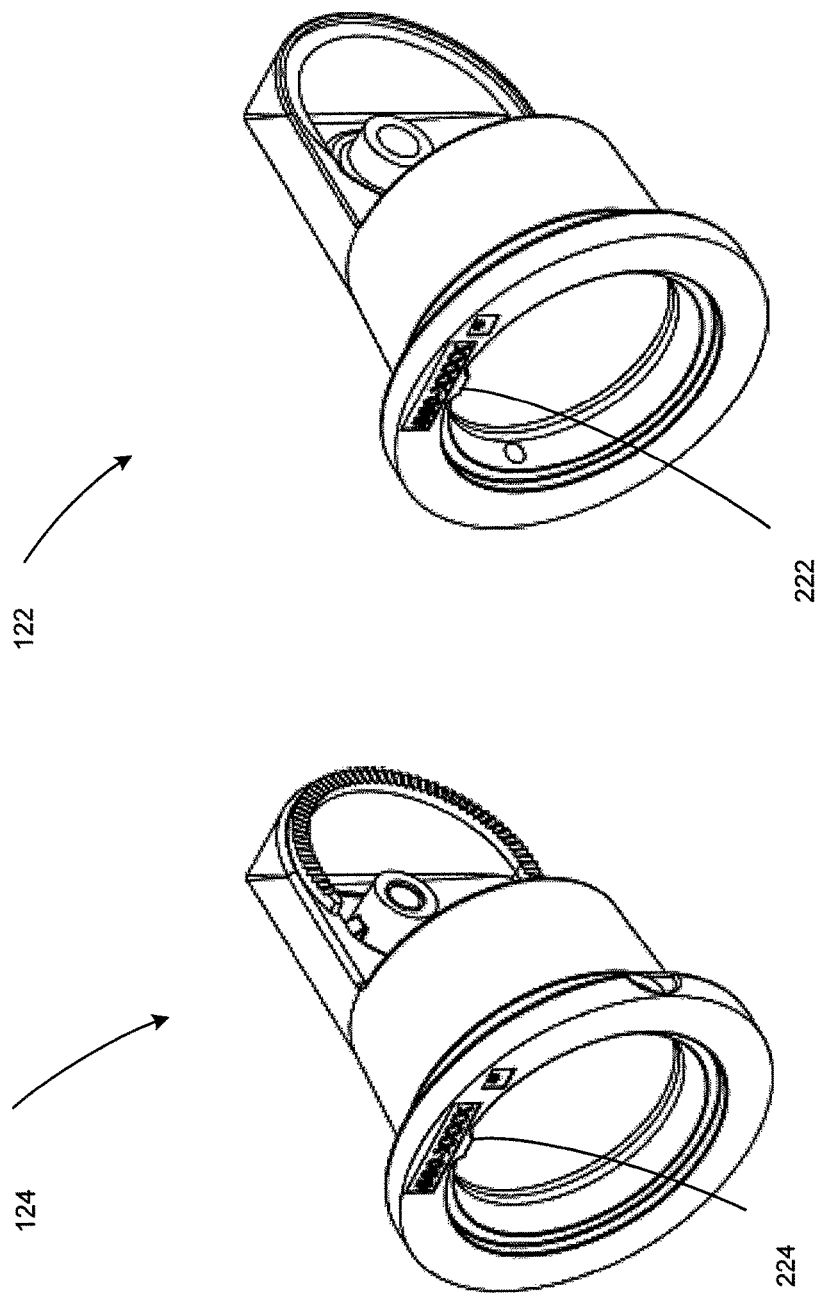
FIG. 2 A is perspective view of a device section and a mounting section of an articulating arm of the camera assembly.
Figure 2:
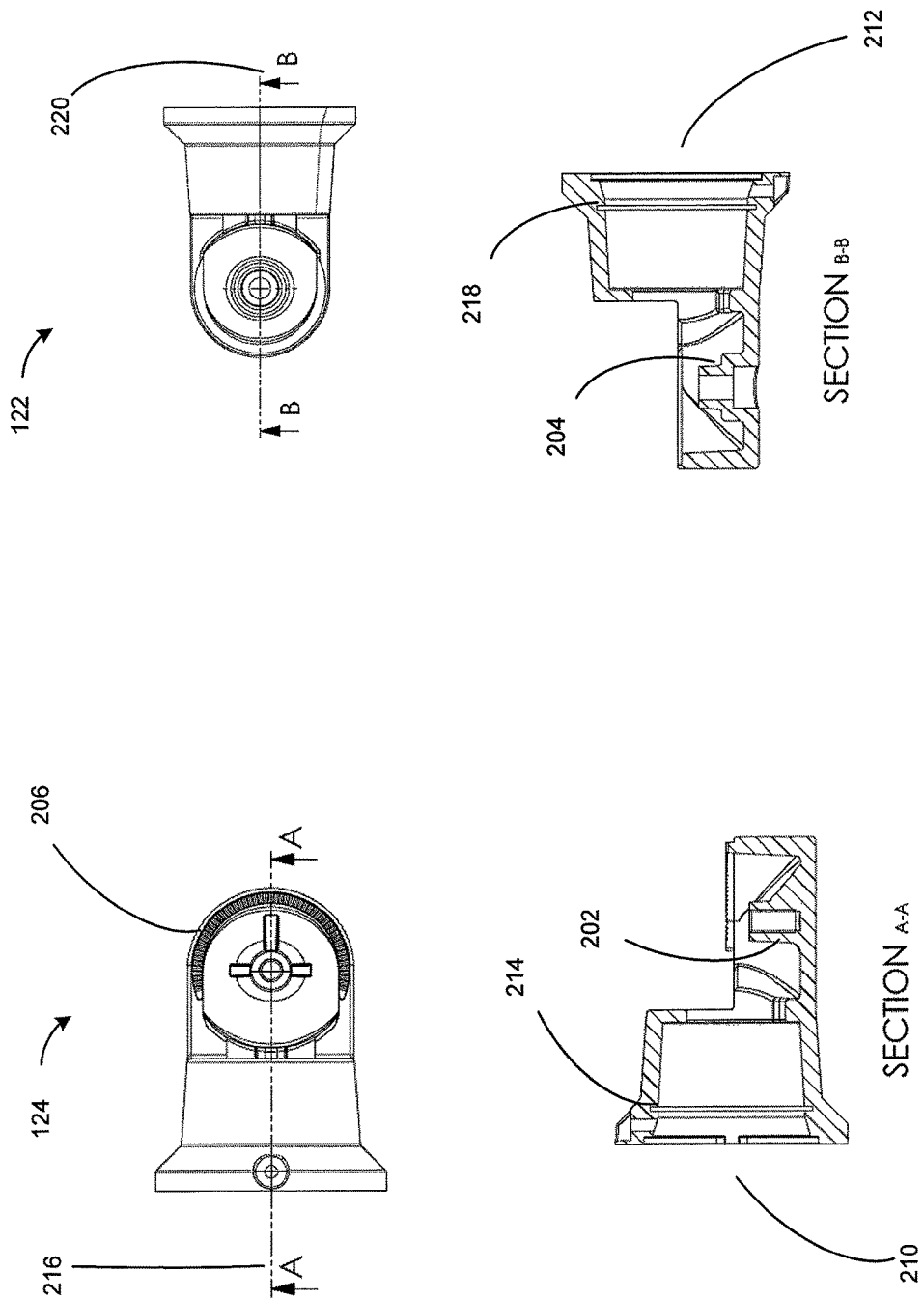
Figure 3:
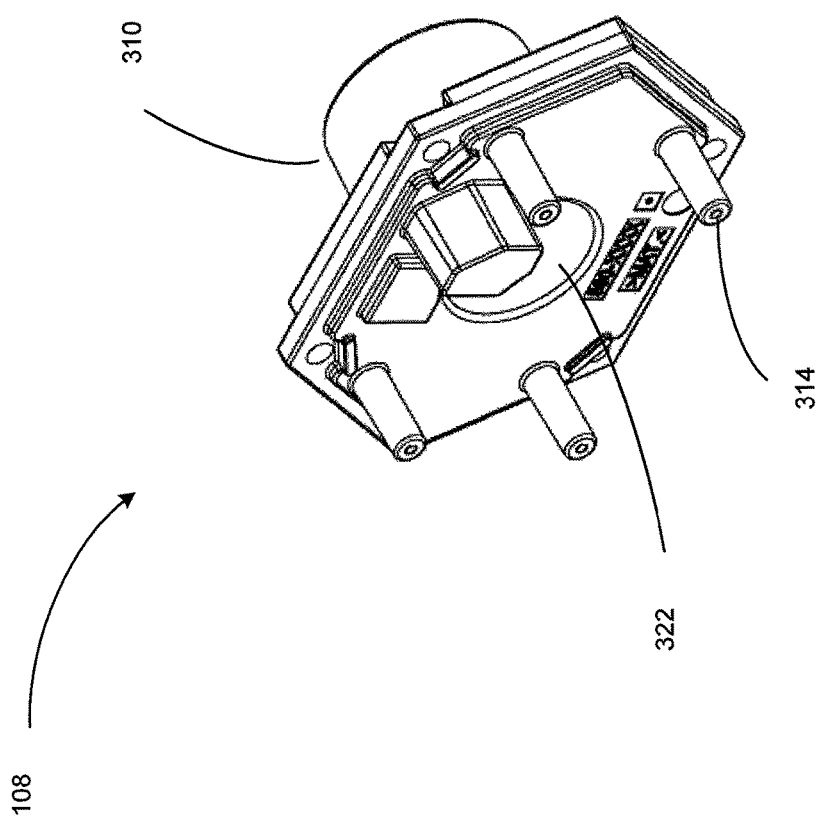
FIG. 3 A is a back perspective view of a device plate of the camera assembly.
Figure 3:
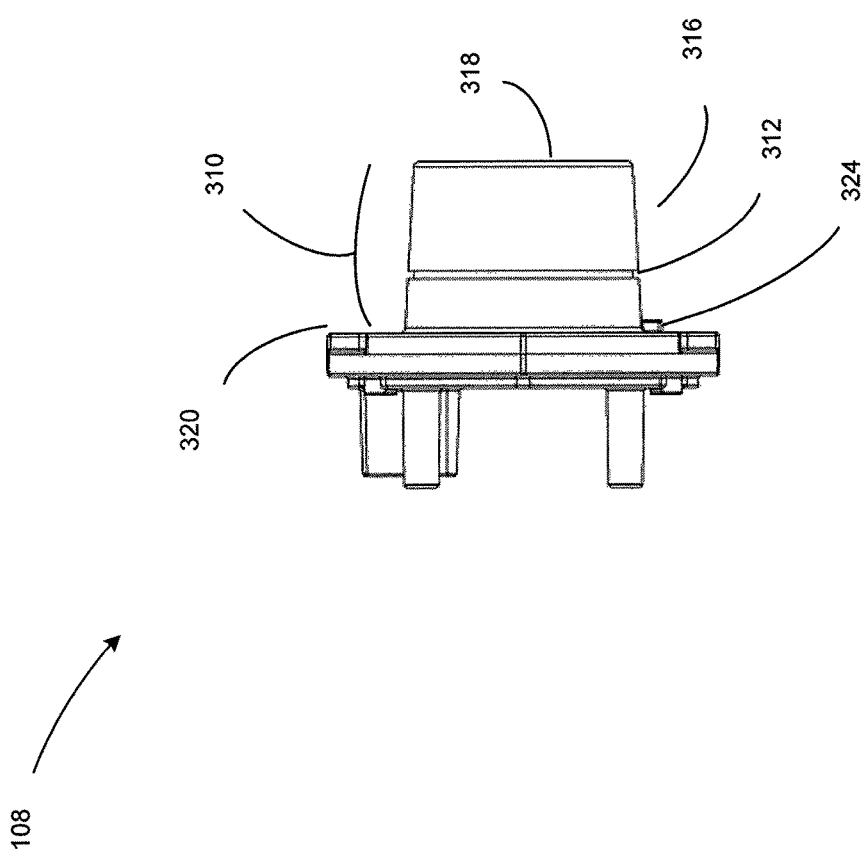

FIGS. 2 A and 2 B respectively show perspective and sectional views of parts of the articulating arm 106 in isolation.

A rod segment extends inwardly from each of the concave surfaces of the device section 124 and the mounting section 122, the rod segment extending from the mounting section 122 is rod segment 204, and the rod segment extending from the device section 124 is rod segment 202. The rod segments 202, 204 align to form a rod into which a screw 132 is screwed through the mounting section 122 to the device section 124. As shown the mounting section 122 and the device section 124 pivots about the screw 132.

A rod (of rod segments 202, 204) and the screw 132 accordingly comprise the hinge joint 126, which permits the mounting section 122 and the device section 124 to pivot relative to each other. The screw 132 can be screwed fully through the rod, thus clamping the mounting and device sections 122,124 together and preventing the mounting section 122 from pivoting relative to the device section 1124. A segment of an edge of the device section 124 lined with teeth 206 that contact an edge of the mounting section 122 provide tactile feedback during pivoting of the mounting and device sections 122,124. The teeth 206 increase the friction between the mounting and device sections 122,124 when the two sections 122,124 are clamped together using the screw 132, thus helping to prevent unwanted movement.

Figure 1D:
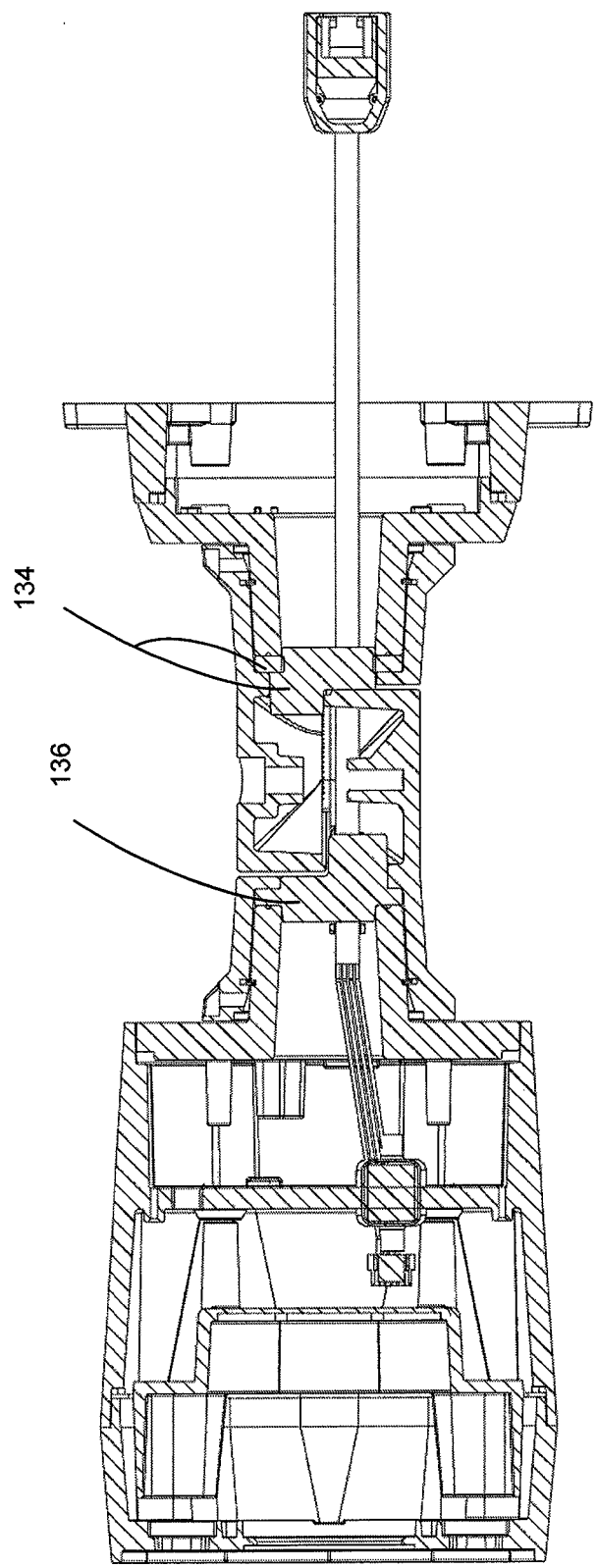

Referring now in particular to FIGS. 1 C, 2 B, 3 A, 3 B and 4, the device swivel joint 130 comprises a cylindrical first male portion of a stud 310 that extends from the device plate 108 and a cylindrical first female portion of a bore 210 that receives the stud 310, starting at the base of the device section 124 of the articulating arm 106. The stud 310 has an annular groove 312 for receiving or seating an inner edge 430 of a retaining ring 410. The bore 210 also has an annular groove 214 for seating an outer edge 420 of the retaining ring 410. The cylindrical first male portion and the cylindrical first female portion along with the retaining ring 410 each has an axis in alignment with the section A-A line 216 to permit the device plate 108 to swivel or rotate relative to the device section 124 of the arm 106.

The stud 310 has an elongate shape, including the cylindrical first male portion, having the annular groove 312, a tapered section 316, a front end 318, and a base end 320 where the tapered section 316 has a smaller end integral with the front end 318 and a larger end towards the base end 320. The device plate 108 has a hollow cavity 322 running from the back of the device plate 108 through the stud 310 and out the front end 318 of the stud 310. There are screw holes 314 for coupling the device plate 108 to the device housing 102.

The device section 108 having the bore 210 with the annular groove 214 is sized for the stud 310 to slide into the bore 210. As is known in the art, the retaining ring 410 is resilient in that the inner edge 430 and the outer edge 420, the diameter of the ring 410, increases or decreases in size as force is applied accordingly. The outer edge 420 of the retaining ring 410 seats in the annular groove 214 of the device section 124, the inner edge 430 of the retaining ring 410 seats in the annular groove 312 of the stud 310 when the stud 310 is slid into the bore 210 of the device section 124, and the inner edge 420 of the retaining ring 410 is sized for the front end 318 of the stud 310 to pass through the retaining ring 410 initially. As the stud 310 slides further into the bore 210, the tapered section 316 forces the ring 410 diameter to enlarge or increase in size for passage of the stud 310 into the bore 210 until the inner edge 430 seats into the annular groove 312 of the stud 310 while engaging annular groove 214. The annular groove 214 is accordingly deep enough for the retaining ring 410 to enlarge as needed. At this point, the stud 310 is snapped into a retained position with the bore 210 and can not slide either further into or out of the bore 210 as the retaining ring 410 is seated in the annular grooves 214, 312.

Figure 4:
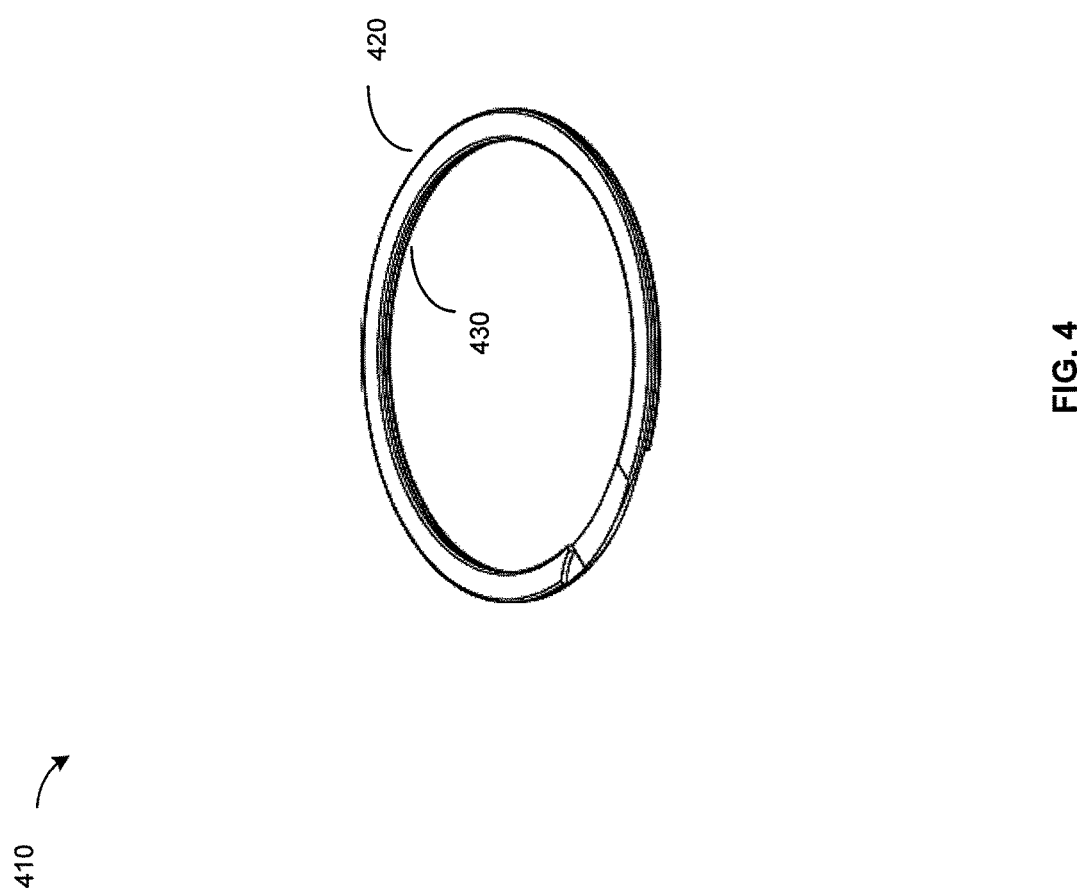
FIG. 4 is a perspective view of a retaining ring of the device section of the camera assembly.
Figure 5:
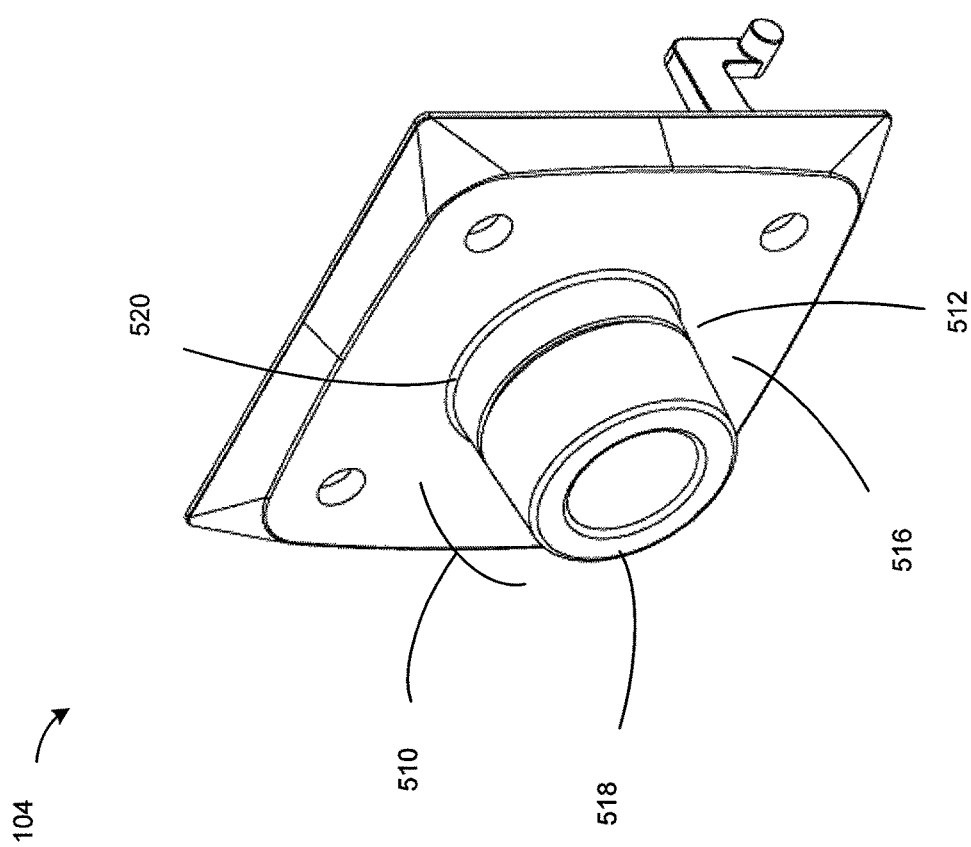
FIG. 5 is a front perspective view of a mounting plate of the camera assembly.

The retaining ring 410 as showing in FIG. 4 is a spiral retaining ring. However, it will be understood that a large number of retaining rings known in the art will also work in the described embodiments such as split retaining rings and open circular retaining rings.

Further, according to another embodiment the grommets 134, 136 have sealing rings such that the sliding of the sealing surfaces are constrained to occur between the face of the studs 310, 510 and the grommet washer sealing rings. The surface areas of the compressed sealing ring is smaller than the opposite side of the washer so that it more freely slides compared to the opposite side, the bores 210, 212.

Analogously, and referring now in particular to FIGS. 1 C, 2 A, 2 B, 5, 6 and 7; the mounting swivel joint 128 comprises a cylindrical first male portion of a stud 510 that extends from the mounting plate 104 and a cylindrical first female portion of a bore 212 that receives the stud 510. The stud 510 has an annular groove 512 for receiving or seating an inner edge 730 of a retaining ring 710. The bore 212 also has an annular groove 218 for seating an outer edge 720 of the retaining ring 710. The cylindrical first male portion and the cylindrical first female portion along with the retaining ring 710 each has an axis in alignment with the section B-B line 220 to permit the mounting plate 104 to swivel or rotate relative to the mounting section 122 of the arm 106.

The stud 510 has an elongate shape, including the cylindrical first male portion, having the annular groove 512, a tapered section 516, a front end 518, and a base end 520 where the tapered section 516 has a smaller end integral with the front end 518 and a larger end towards the base end 520. The mounting plate 104 has a hollow cavity running from the back of the mounting plate 104 through the stud 510 and out the front end 518 of the stud 510.

The mounting section 122 having the bore 212 with the annular groove 218 is sized for the stud 510 to slide into the bore 212. As is known in the art, the retaining ring 710 is resilient in that the inner edge 730 and the outer edge 720, the diameter of the ring 410, increases or decreases in size as force is applied accordingly. The outer edge 720 of the retaining ring 710 seats in the annular groove 218 of the mounting section 122, the inner edge 730 of the retaining ring 710 seats in the annular groove 512 of the stud 510 when the stud 510 is slid into the bore 212 of the mounting section 122, and the inner edge 720 of the retaining ring 710 is sized for the front end 518 of the stud 510 to pass through the retaining ring 710 initially. As the stud 510 slides further into the bore 212, the tapered section 516 forces the retaining ring 410 diameter to enlarge or increase in size for passage of the stud 510 into the bore 212 until the inner edge 730 seats into the annular groove 512 of the stud 510. The annular groove 218 is accordingly deep enough for the retaining ring 710 to enlarge as needed. At this point, the stud 510 is snapped into a retained position with the bore 212 and can not slide either further into or out of the bore 212 as the retaining ring 710 is seated in the annular grooves 218, 512.

According to one embodiment, the retaining ring 410 is a spiral design, because such rings may have a low profile and ease of expansion. Other retaining rings would work but may require more than hand pressure to assemble. Alternatively, a retaining ring may be seated on a stud of a plate for insertion into a tapered portion of a bore of a section (for example a taper bell section). However, it may harder to compress the retaining ring using the tapered bell section in this configuration.

The interiors of the sections 122, 124 and the plates 104, 108 collectively comprise a wiring conduit extending through the interior of the articulating arm permitting wire harness 120 to pass from the device plate 108 through a hole 318 to the mounting plate 104 and out through a hole 522 while entirely contained within the articulating arm.

In a further embodiment, the retaining ring 410 is the same size as the retaining ring 710 and that the mounting swivel joint 128 is same size as the device swivel joint 130.

In a further embodiment, the studs 310, 510 do not have the tapered section. The annular grooves 312, 512 are deep enough for the retaining rings 410, 710 to be compressed or decreased in diameter to fit therein for the studs 310, 510 to slide into the bores 210, 212 wherein the retaining rings 410, 710 resiliently decompress or enlarge to seat into the annular grooves 214, 218 to accordingly couple the bores 210, 212 with the studs 310, 510 in the retained position.

Figure 6:
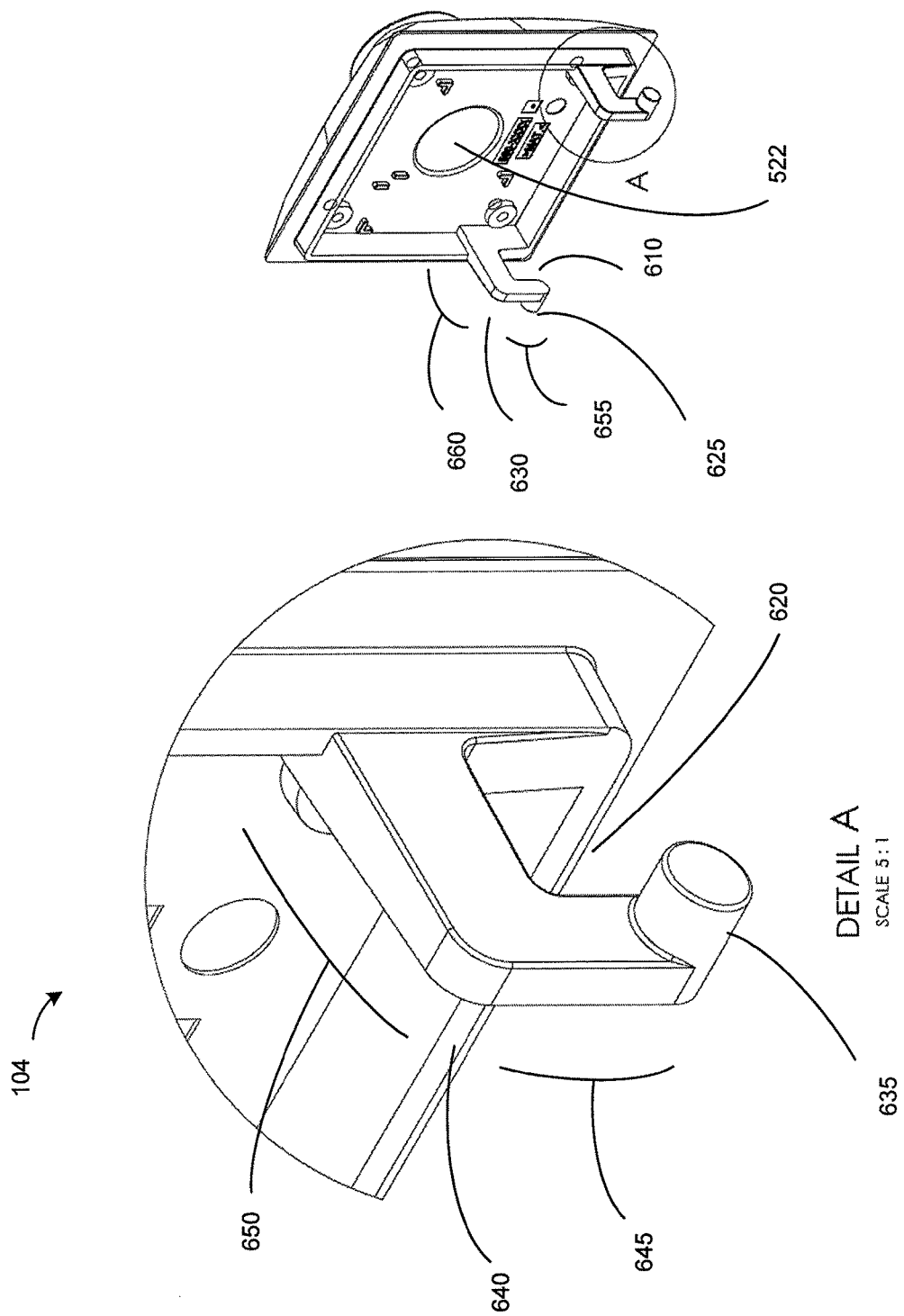
FIG. 6 is a back perspective view of the mounting plate with a detail A.
Figure 7:
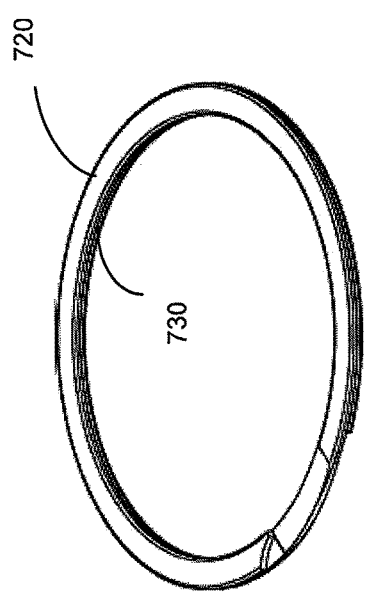
FIG. 7 is a perspective view of a retaining ring of the mounting section of the camera assembly.

Referring now to FIG. 6, there is shown a back perspective view of the mounting plate with an expanded view of detail A. The mounting plate 104 further comprising a first hook 610 and a second hook 620. The first hook 610 comprising a first pivot pin 625 and a first hook arm 630. The second hook 620 comprising a second pivot pin 635 and a second hook arm 640. The first pivot pin 625 and the second pivot pin 635 each having a cylindrical portion for the mounting plate 104 to pivot or rotate about an axis of the pins 625, 635.

Figure 8:
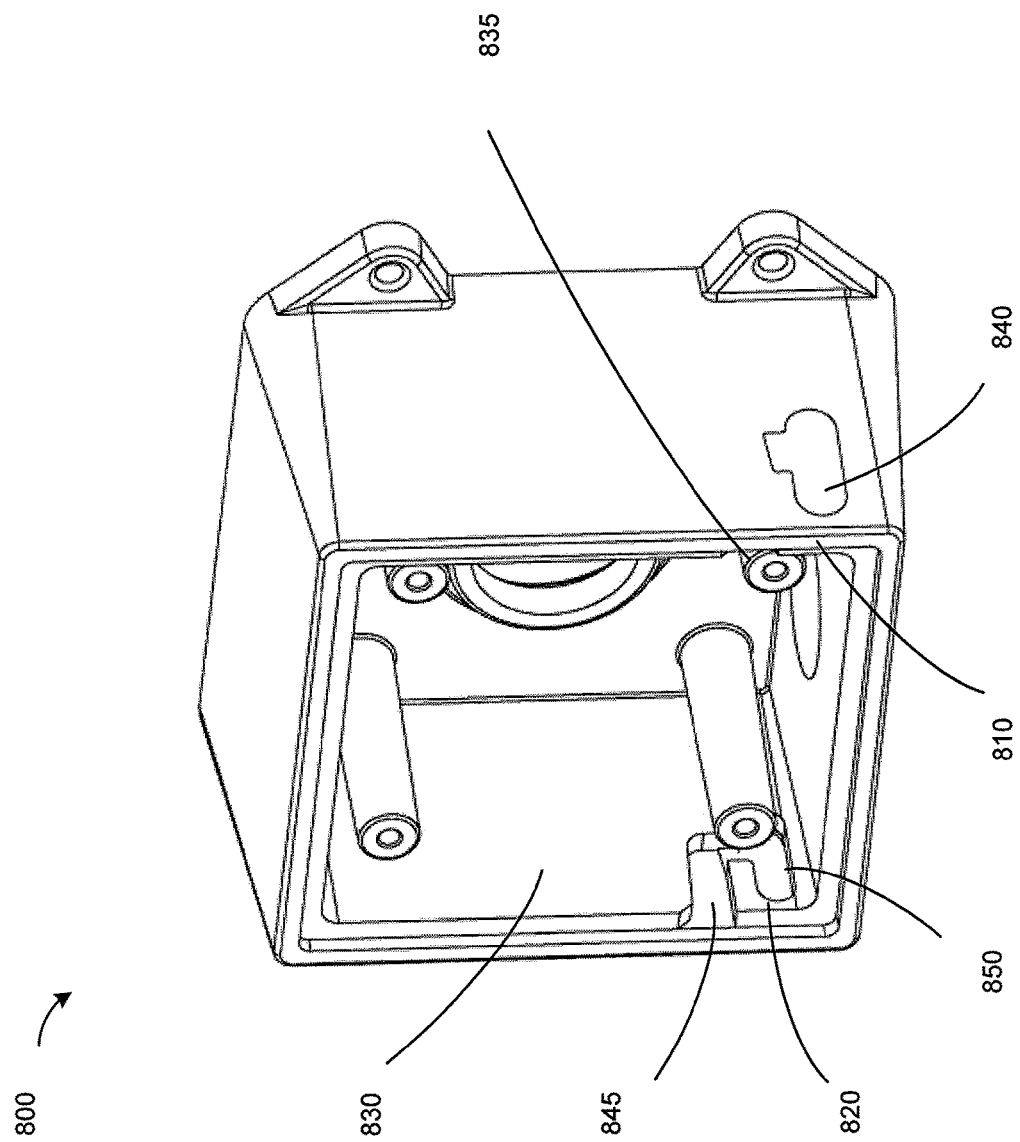
FIG. 8 A is a right perspective view of a junction box according to another embodiment.
Figure 8:
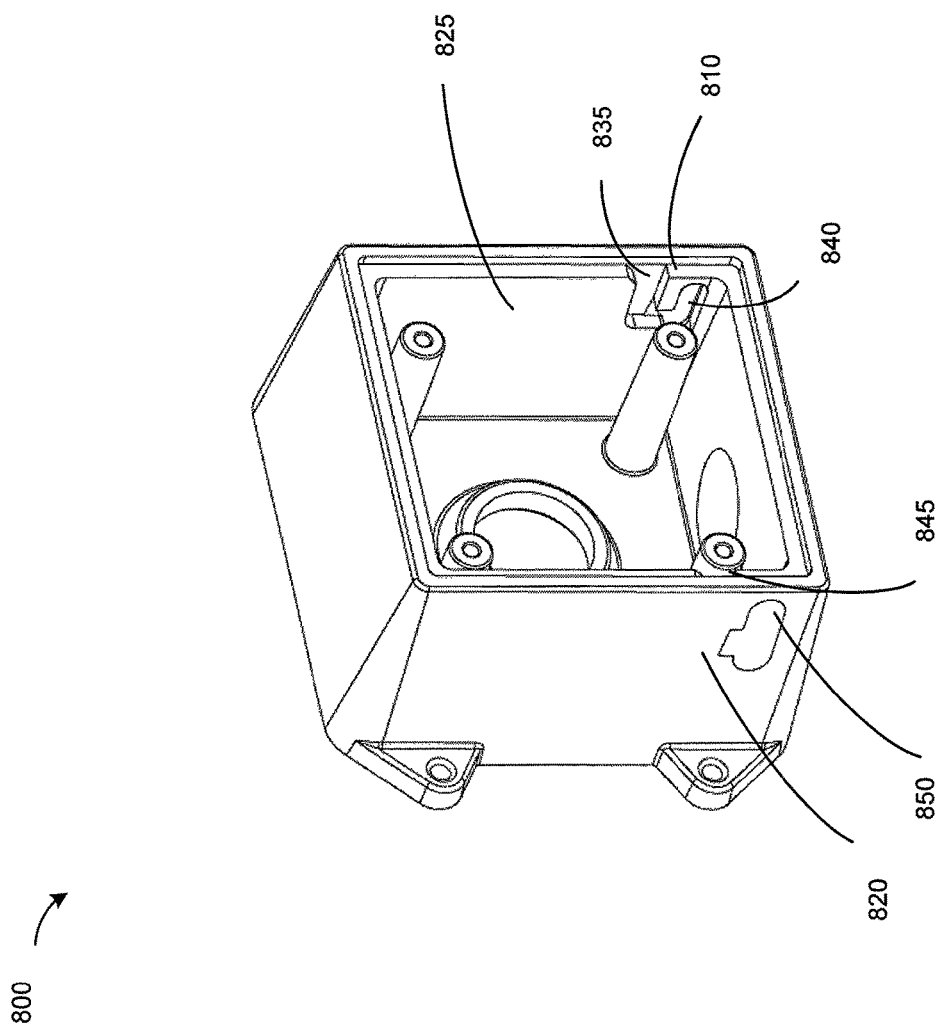

Referring now to FIGS. 8 A, 8 B, 8 C, and 8 D; there is respectively shown right and left perspective views, a top view, and a sectional view of a junction box 800. FIG. 8 C is a sectional view along line B-B of FIG. 8 B. The junction box 800 comprising a first hook slot 810 and a second hook slot 820. The first hook slot 810 on a first inside wall 825 (at a first side) of the junction box 800 and a second hook slot 820 on a second inside wall 830 (at a second side) of the junction box 800 where the first inside wall 825 is opposite to the second inside 830, and the first hook slot 810 and the second hook slot 820 each having an open end 835, 845 and a retaining end 840, 850.

The first hook slot 810 is a U shaped slot with the open end 835 at one end and the retaining end 840 at the other end and wherein the second hook slot 820 is a U shaped slot with the open end 840 at one end and the retaining end 850 at the other end. The first hook slot 810 is a mirror image of the second hook slot 820. The hook slots 810, 820 are grooves in the walls of the bracket 110. Part or all of the grooves may extend through the wall of the bracket 110. As depicted in FIGS. 8 A, 8 B, 8 C and 8 D; the retained end 840, 850 extend through the wall of the bracket 110.

Figure 9:
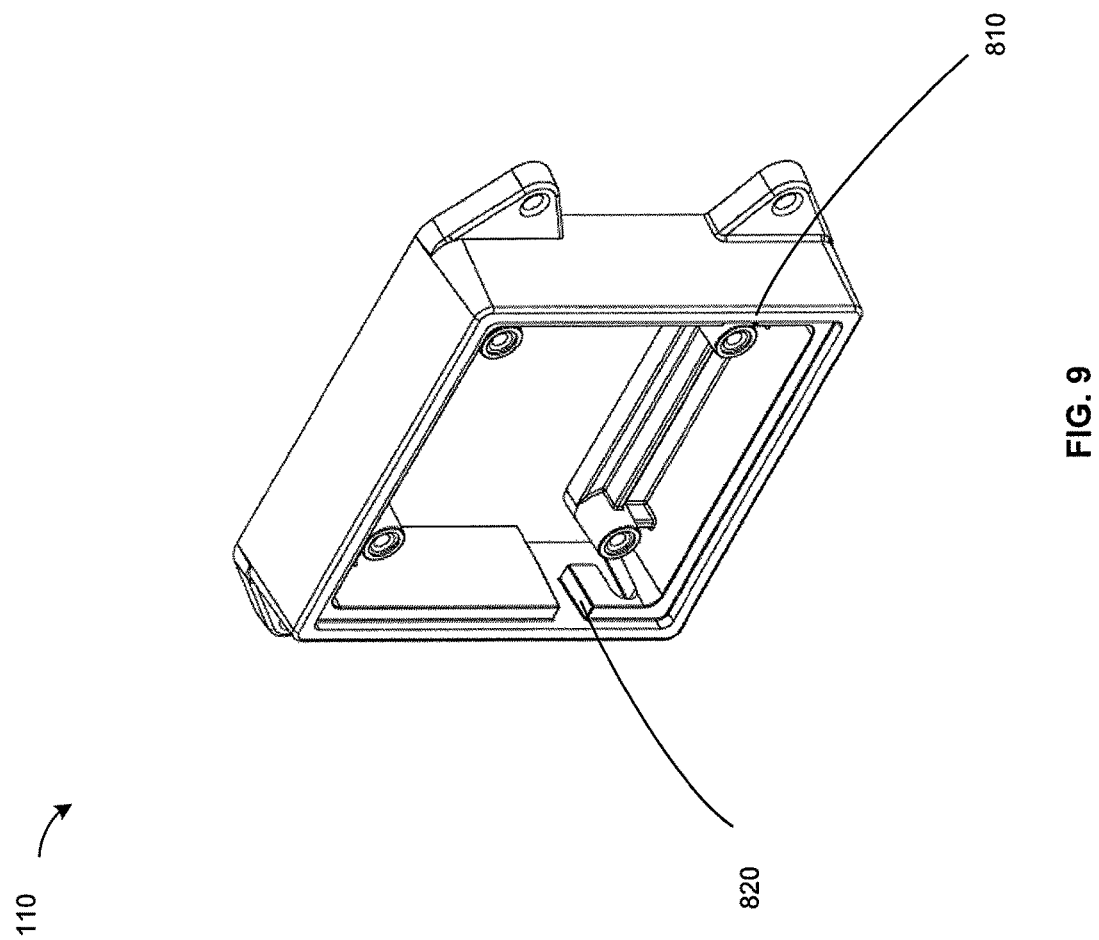
FIG. 9 is a perspective view of the mounting bracket.

Referring now to FIG. 9, there is show a perspective view of the bracket 110 with the first hook slot 810 and the second hook slot 820 built into the walls of the bracket 110. The hook slots 810, 820 are grooves in the walls of the bracket 110 with holes for the retained ends 840, 850. Alternatively, part or all of the grooves may be holes in the walls of the bracket 110. This is advantageous as the bracket 110 may be manufactured by molding for most of its features. Analogously, the junction box 800 may also be manufactured by molding.

The difference between a junction box and a bracket is that the bracket does not have a backing wall like backing wall 860 on the junction box 800. The camera assembly may be mounted on either the junction box 800 or the bracket 110. A bracket is herein defined to include a junction box.

In accordance with another embodiment, the sections 122, 124 and the plates 104, 108 each have a stop block. The stop blocks 222, 224, 324, 524 limit the rotation of the swivel joints 128, 130 to approximately +/−180 degrees. The stop blocks 222, 224, 324, 524 ride in a non-continuous open groove in the sections 122, 124 and the plates 104, 108. Actual range of motion is about 350 degrees as some space is taken up by the stop blocks. This feature prevents the wiring harness 120 in the device housing 102 and the bracket 110/junction box 800 by the wall from being rotated more than 360 degrees from its normal position. This feature should prevent excessive winding of the wiring cable which could otherwise damage the connectors and or disengage the electrical connections.

Figure 10:
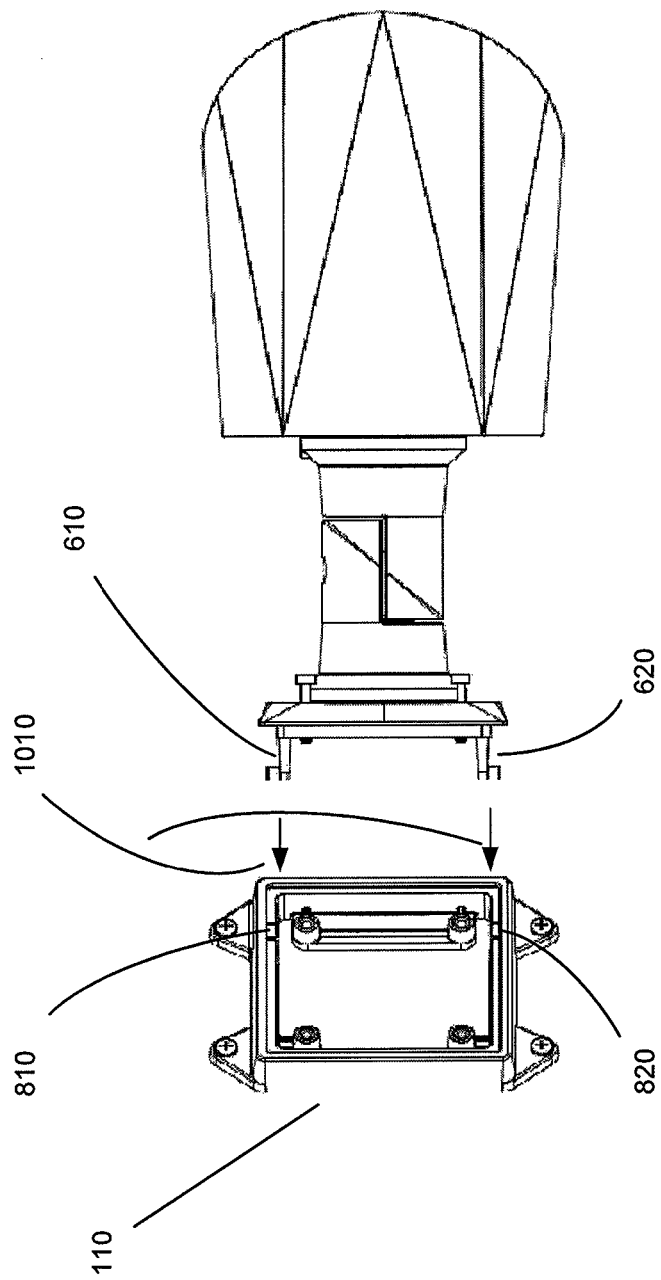
FIG. 10 is a perspective view of the camera assembly being inserted into the mounting bracket.

Referring now to FIG. 10, there is shown a perspective view of the camera assembly being inserted into the bracket 110. The hooks 610, 620 and the hook slots 810, 820 together comprise a removable hinge. The insertion path indicated by arrows 1010 shows the hooks 610, 620 being inserted into the open ends 835, 845 of the hook slots 810, 820. An aligned position is when the hooks 610, 620 are at the open ends 835, 845 of the hook slots 810, 820.

The first hook 610 on one side of the mounting plate 104 and a second hook on opposite side of the mounting plate 104 where the first hook 810 fits into the first open end 835 of the first hook slot 810 and the second hook 820 fits into the second open end 845 of the second hook slot 820, and the first hook 610 slides along the first hook slot 810 to the first retaining end 845 and the second hook 620 slides along the second hook slot 845 to the second retaining end 850. The first hook 610 and the second hook 620 are positioned on the mounting plate 104 such that the first hook 610 and the second hook 620 are retained in the first hook slot 810 and the second hook slot 820. The mounting plate 104 is removable from the bracket 110 by sliding the first hook 610 from the first hook slot 810 out of the open end 835 and the second hook 620 from the second hook slot out 820 of the open end 845.

Figure 11:
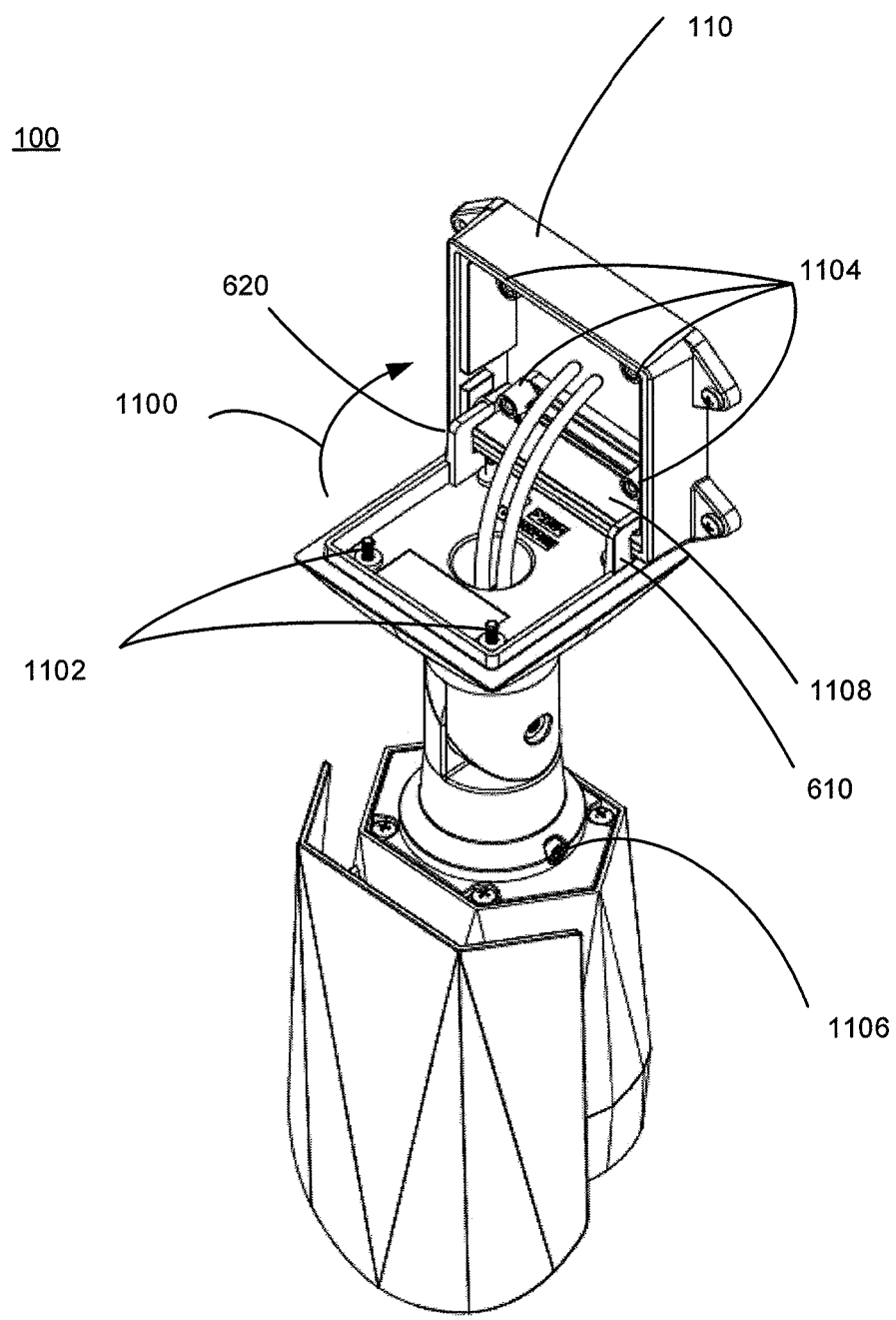
FIG. 11 is a perspective view of the camera assembly hanging on the mounting bracket.

Referring now to FIG. 11, there is show a perspective view of the camera assembly 100 hanging attached to the bracket 110. The bracket 110 is shown attached to a wall. The camera assembly 100 is rotated along path 1100 for the mounting plate 104 to close against the bracket 110 which is then locked into place using screws 1102 into the screw holes 1104.

As shown, the camera assembly 100 with the mounting plate 104 is in an open position when the first hook 610 is at the retaining end 840 of the first hook slot 810 and the second hook 620 is at the retaining end 850 of the second hook slot 820.

The first hook 610 with the first pivot pin 625 and the second hook 620 with the second pivot pin 635, the first pivot pin 625 and the second pivot pin 635 are respectively in the first hook slot 810 and the second hook slot 820 and are aligned along an axis such that the mounting plate 104 is hinged to the bracket 110.

As shown in FIGS. 6 and 11, the first hook arm 630 and the second hook arm 640 are configured to act as a stop to limit the mounting plate 104, hinged to the bracket 110, from opening beyond a predetermined angle. The angle being approximately 90 degrees to prevent the camera assembly 100 from rotating beyond and hitting the wall upon which the bracket 110 has been mounted thereto. Alternatively, there are other methods of constructing a stop such as a metal tab on the bracket 110 or mounting plate 104 to prevent the camera assembly 100 from swing beyond certain limits.

In accordance with another embodiment; the hook arms 630, 640 have pin arm portions 645, 655 and second arm portions 650, 660 joined at approximately 90 degrees in angle; which when combined with the rest of the mounting plate 104 form a C shape for receiving a bottom wall 1108 of the bracket 110 as shown in FIG. 11 where the camera assembly 100 is hanging from the bracket 110 mounted on a wall or ceiling: a wiring cable connection position or a hanging position. In this position, it is harder for the hooks 610, 620 to leave the hook slots 810, 820 of the bracket 110/junction box 800 as, firstly, the pin arm portions 645, 655 are not sized to have sufficient length to leave the retained ends 840, 850 from this position, and secondly, these parts are sized such that the parts are locked and may not be separated until the camera assembly 100 is rotated back closer to the aligned position, as shown in FIG. 10. The aligned position is for inserting (engaging) or releasing (disengaging) the hooks 610, 620 into/from the bracket 110/junction box 800.

This embodiment is particularly advantageous during installation or maintenance of the camera assembly 100 in the hanging position as it would be more difficult to accidentally knock the camera assembly 100 out of the bracket 110/junction box 800 and thereby dropping it.

Figure 12:
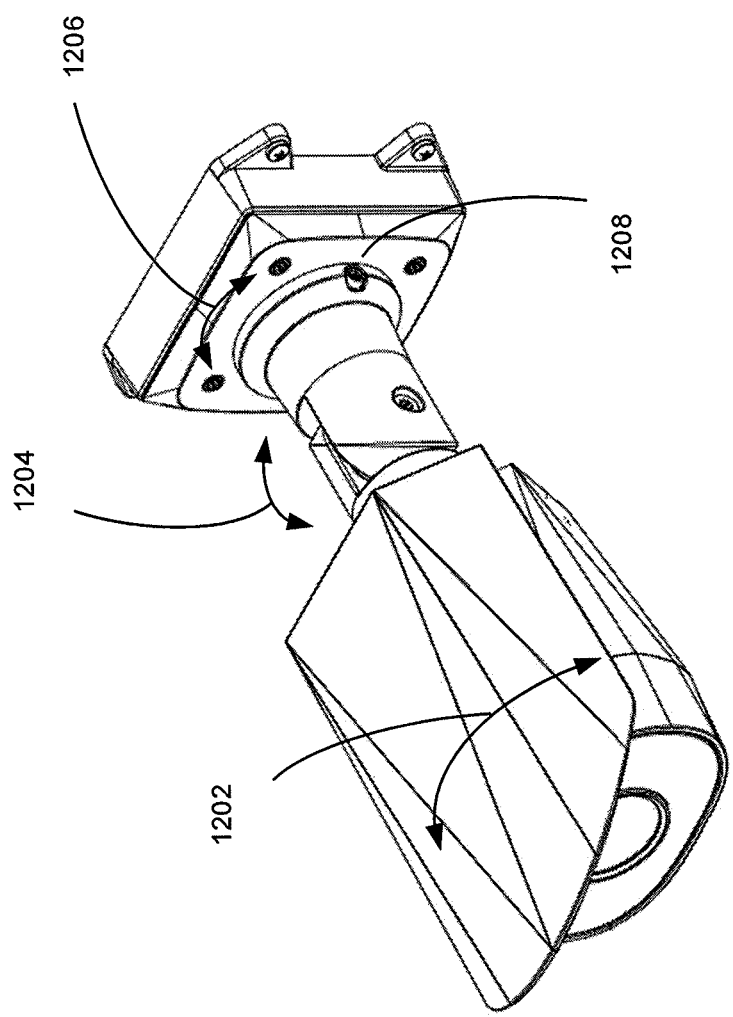
FIG. 12 is a perspective view of the camera assembly with the mounting bracket showing the rotation movements of the articulating arm.

Referring to FIG. 12, there is shown a perspective view of the camera assembly 100 installed on a wall with the bracket 110. There is shown the three possible rotations as configured. The device housing swivels or rotates 1202 relative to the device section 124. The articulating arm 106 rotates 1204 around the hinged joint 126. The mounting section 122 swivels or rotates 1206 relative to the mounting plate 104.

The shape of the mount plate 104 and the bracket 110 can be square, rectangular, hexagon, but further may be any other shape, including irregular shapes and oval/round shapes, providing there are metal pegs or such for hook slots.

The depicted embodiments have the hooks 610, 620 attached to the mounting plate 104. Alternatively, the hooks 610, 620 may be attached to the bracket 110 and the hook slots 810, 820 being part of the mounting plate 104 instead. In addition, the mounting plate 104 may include one hook and one hook slot for mating with corresponding one hook slot and one hook on the bracket.

Figure 13:
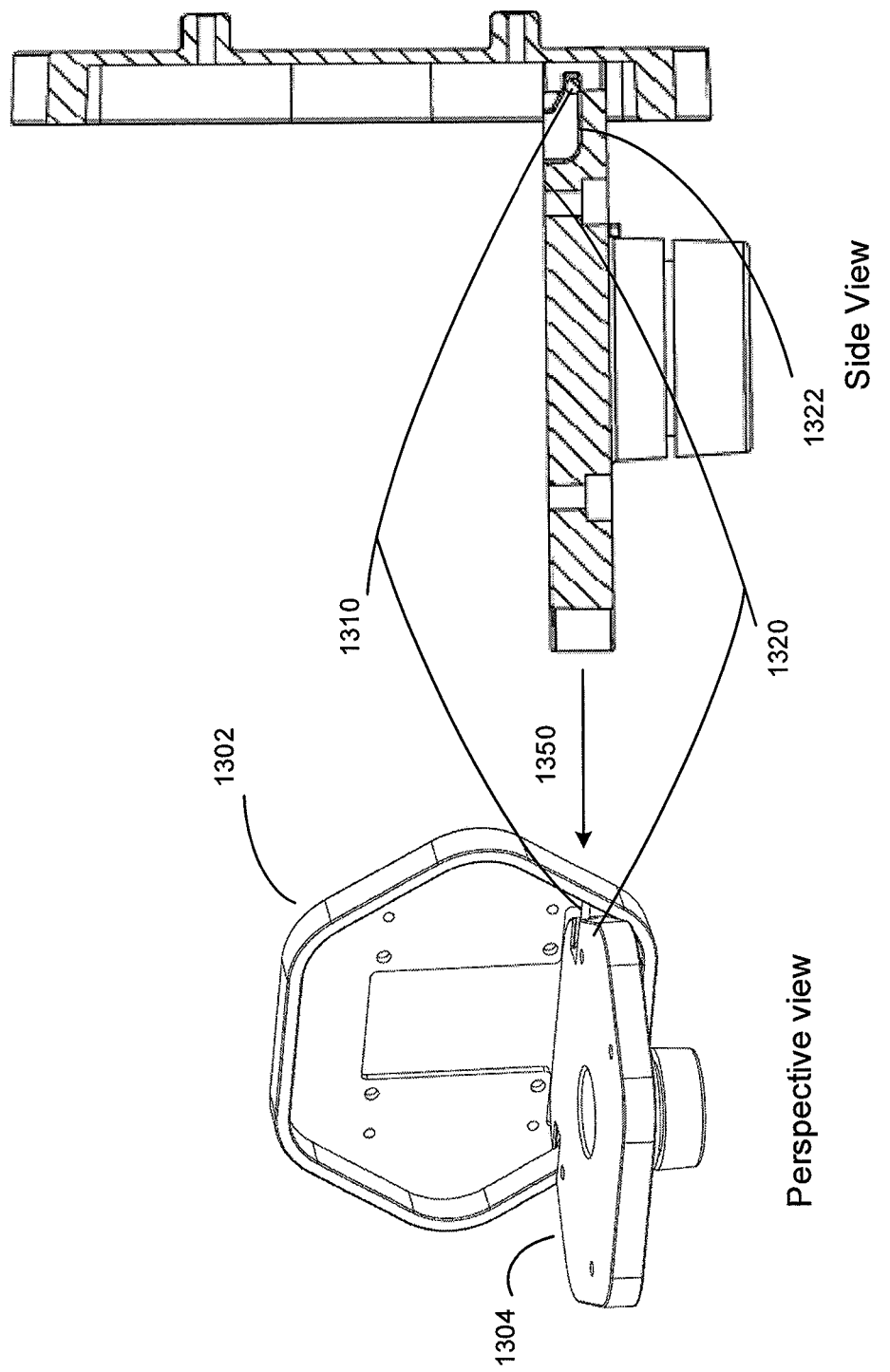
FIG. 13 is perspective view of a hex plate and a hex bracket according to another embodiment.

Referring to FIG. 13, there is shown a perspective of a hex plate 1304 and a hex bracket 1302 with a side view of a hex hook slot 1320 in accordance with another embodiment having hexagon shaped plate and bracket. The hex bracket 102 having a hex hook 1310, the hex hook 1310 comprising a pivot pin with arms being integrated into the walls of the hex bracket 102. The side view being viewed from angle 1350 of the hex slot 1320. FIG. 13 shows the hex plate 1304 and the hex bracket 102 in an opened position with the hex hook 1310 in a retaining end 1322 of the hex hook slot 1320.

Figure 14:
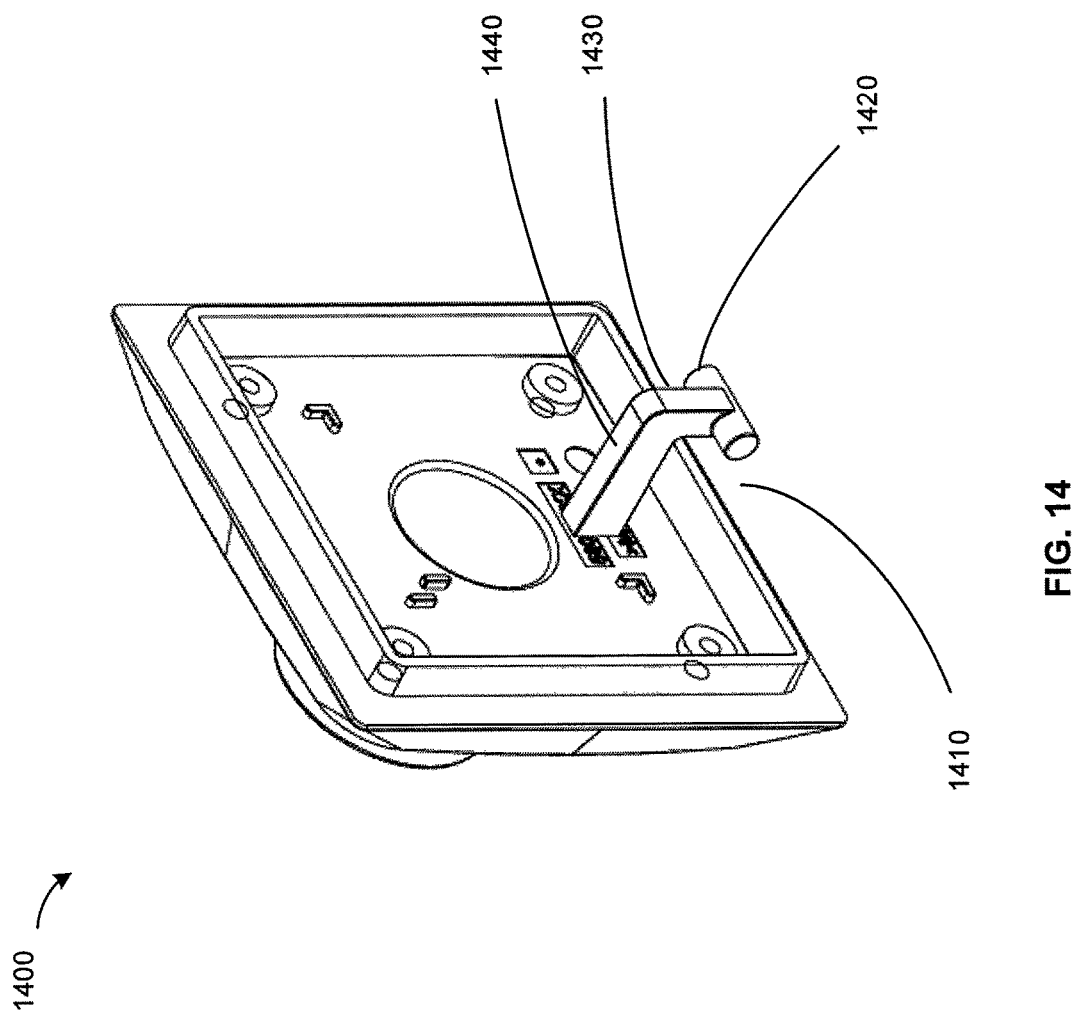
FIG. 14 is a perspective view of a plate according to another embodiment.

Referring to FIG. 14, there is shown a perspective view of a plate 1400 according to another embodiment. The plate 1400 comprising a hook 1410. The hook 1410 having a pivot pin 1420, a pin arm portion 1430, and a second arm portion 1440. The hook 1410 has a T shaped pivot pin end. Alternatively, the hook 1410 may be hooks analogous to the hooks 610, 620 place adjacent to one another to create a pivot pin end that functions the same the T shaped pin end of the hook 1410.

Figure 15:
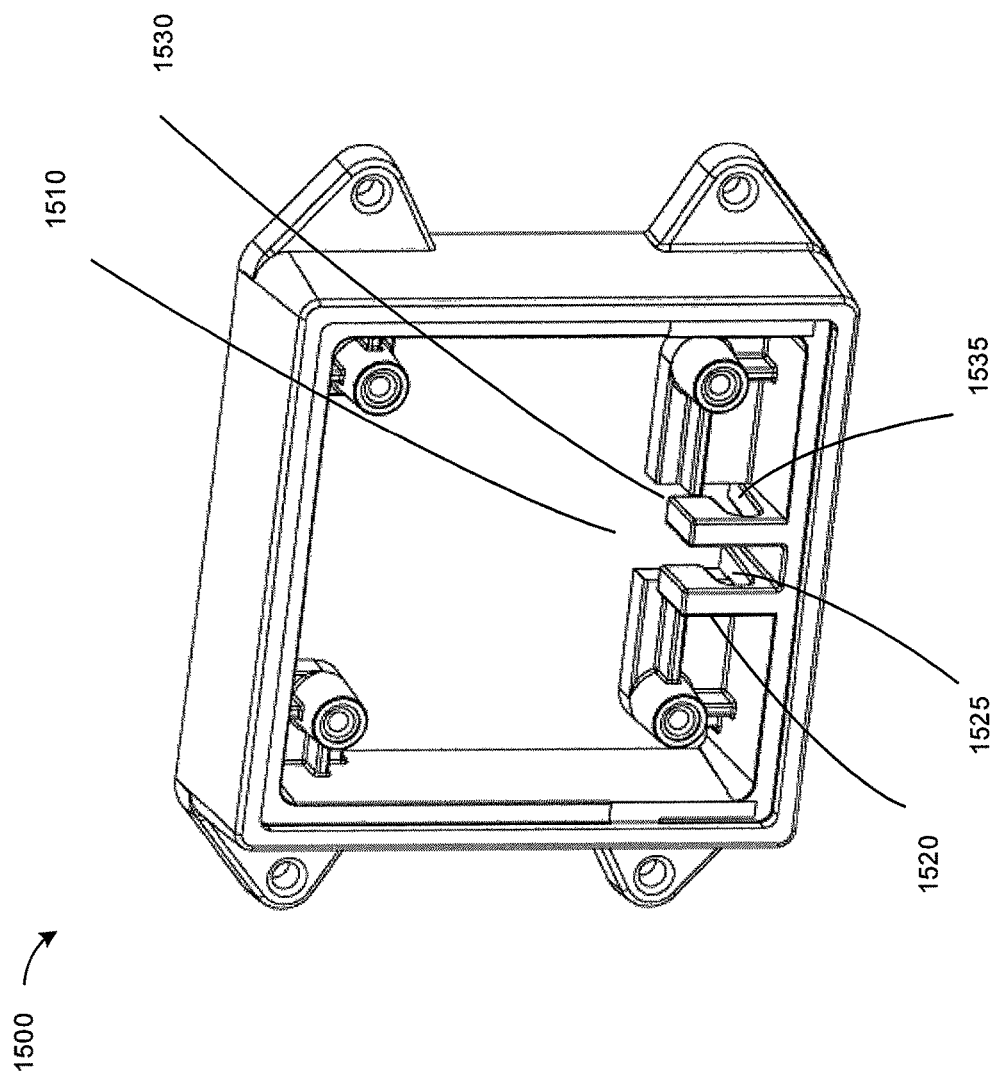
FIG. 15 is perspective view of a bracket according to another embodiment.

Referring to FIG. 15, there is shown a perspective view of a bracket 1500 according to another embodiment. The bracket 1500 comprising a first hook slot 1520 on a first side with a first retaining end 1525 on a first side and a second hook slot 1530 with a second retaining end 1535 on a second side. The hook slots 1520, 1530 analogously have open ends like the open ends 835, 845 except it would effectively be the rest of the open spaces in the bracket 1500.

Alternatively, one of the first hook slot 1520 and second hook slot 1530 may be a blank metal part (or the blank metal part is integrated into a wall of the bracket) with one of the retaining ends 1525, 1535 filled in. In this embodiment, the hook may be one of the hooks 610, 620 from the other embodiments placed accordingly.

Figure 16:
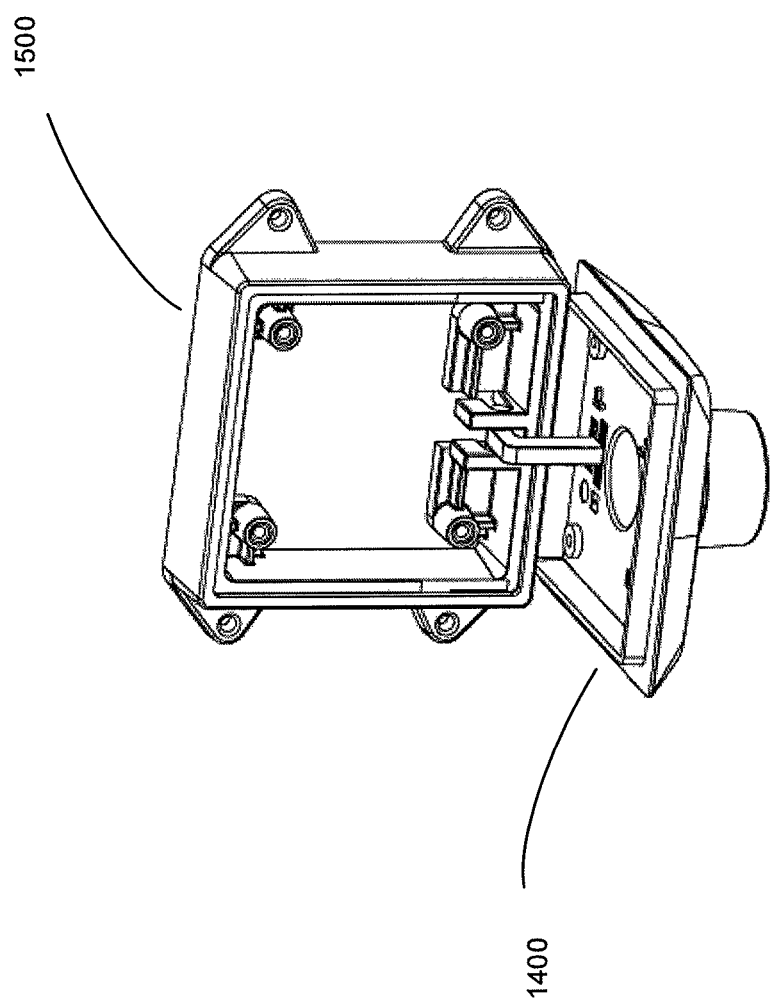
FIG. 16 is a perspective view of the plate of FIG. 14 and the bracket of FIG. 15 in a hanging position.

Referring to FIG. 16, there is shown a perspective view of the plate 1400 and the bracket 1500 in a hanging position analogous to the hanging position shown in FIG. 11 and with the same advantages thereof. The plate 1400 and the bracket 1500 analogously also have an aligned position similar to that shown in FIG. 10. While the plate 1400 and the bracket 1500 are depicted as square or rectangle, it will be clear to any person skilled in the art that this single arm hook embodiment may be applied to any other shaped plates and brackets including hexagon, round or oval plates and brackets.

The embodiments depicted herein have particularly advantageous with the installation of a security camera. The bracket can be mounted to a wall or ceiling without the camera assembly being attached. Once the bracket is mounted to wall, the camera assembly with the hooks can then be inserted into the hook slots and hung in an open position for the wiring to be connected before closing the mounting plate to the bracket. The camera assembly can then be rotated as shown to point the camera in the desired position before it is locked into position by, for example, three screws 132, 1106, 1208.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible. In particular, it is noted that there are many other possible, not shown, embodiments using the parts shown above such as the hooks and the hook slots.

We claim:

1. A removable hinge for connecting a plate to a bracket comprising:
a first hook slot on a first inside of the bracket and a second hook slot on a second inside of the bracket where the first inside is opposite to the second inside, and the first hook slot and the second hook slot each having an open end and a retaining end;
a first hook on one side of the plate and a second hook on an opposite side of the plate where the first hook fits into the open end of the first hook slot and the second hook fits into the open end of the second hook slot, and the first hook slides along the first hook slot to the retaining end and the second hook slides along the second hook slot to the retaining end; and
a stop to limit the plate, hinged to the bracket, from opening beyond an angle of approximately 90 degrees,
wherein the first hook and the second hook are positioned on the plate such that the first hook and the second hook are retained in the first hook slot and the second hook slot, respectively,
wherein the plate is in a hanging position when the first hook is at the retaining end of the first hook slot and the second hook is at the retaining end of the second hook slot,
wherein the plate is removable from the bracket by sliding the first hook from the first hook slot out of the open end of the first hook slot and the second hook from the second hook slot out of the open end of the second hook slot, and
wherein the first hook comprises a first pivot pin and the second hook comprises a second pivot pin, the first pivot pin and the second pivot pin in the first hook slot and the second hook slot, respectively, are aligned along an axis such that the plate is hinged to the bracket.

2. The removable hinge of claim 1, wherein the first hook slot is a U shaped slot with the open end at one end and the retaining end at the other end and wherein the second hook slot is a U shaped slot with the open end at one end and the retaining end at the other end, and wherein the first hook slot and the second hook slot are integrated into walls of the bracket.

3. The removable hinge of claim 1, wherein the plate and the bracket are one of square shaped, rectangular shaped, hexagon shaped, oval shaped and irregular shaped.

4. The removable hinge of claim 1, wherein the first hook further comprises a first hook arm connecting the first pivot pin to the plate, the second hook further comprises a second hook arm connecting the second pivot pin to the plate, and the stop comprises the first and second hook arms.

5. A camera assembly comprising:
a device housing for housing electronic devices;
a device section coupled to the device housing;
a mounting section coupled to the device section;
a mounting plate coupled to the mounting section;
a bracket coupled to the mounting plate over a removable hinge; and
a stop to limit the mounting plate, hinged to the bracket, from opening beyond an angle of approximately 90 degrees,
wherein the removable hinge comprises
a first hook slot on a first inside of the bracket and a second hook slot on a second inside of the bracket where the first inside is opposite to the second inside, and the first hook slot and the second hook slot each having an open end and a retaining end; and
a first hook on one side of the mounting plate and a second hook on an opposite side of the mounting plate where the first hook fits into the open end of the first hook slot and the second hook fits into the open end of the second hook slot, and the first hook slides along the first hook slot to the retaining end and the second hook slides along the second hook slot to the retaining end;
wherein the first hook and the second hook are positioned on the mounting plate such that the first hook and the second hook are retained in the first hook slot and the second hook slot, respectively,
wherein the mounting plate is in a hanging position when the first hook is at the retaining end of the first hook slot and the second hook is at the retaining end of the second hook slot,
wherein the mounting plate is removable from the bracket by sliding the first hook from the first hook slot out of the open end of the first hook slot and the second hook from the second hook slot out of the open end of the second hook slot, and
wherein the first hook comprises a first pivot pin and the second hook comprises a second pivot pin, the first pivot pin and the second pivot pin in the first hook slot and the second hook slot, respectively, are aligned along an axis such that the mounting plate is hinged to the bracket.

6. The camera assembly of claim 5, wherein the first hook slot is a U shaped slot with the open end at one end and the retaining end at the other end and wherein the second hook slot is a U shaped slot with the open end at one end and the retaining end at the other end, and wherein the first hook slot and the second hook slot are integrated into walls of the bracket.

7. The camera assembly of claim 5, wherein the mounting plate and the bracket are one of square shaped, rectangular shaped, hexagon shaped, oval shaped and irregular shaped.

8. The camera assembly of claim 5, wherein the first hook further comprises a first hook arm connecting the first pivot pin to the mounting plate, the second hook further comprises a second hook arm connecting the second pivot pin to the mounting plate, and the stop comprises the first and second hook arms.

9. The camera assembly of claim 5, wherein the bracket is for mounting to a wall and the device housing is shaped such that the stop prevents the device housing from hitting the wall.

10. A removable hinge for connecting a plate to a bracket comprising:
a hook slot on the bracket, the hook slot having an open end and a retaining end;
a hook on the plate where the hook fits into the open end of the hook slot and the hook slides along the hook slot to the retaining end; and
a stop to limit the plate, hinged to the bracket, from opening beyond an angle of approximately 90 degrees,
wherein the plate is in a hanging position when the hook is at the retaining end of the hook slot,
wherein the plate is removable from the bracket by sliding the hook from the hook slot out of the open end, and
wherein the hook comprises a pivot pin, the pivot pin in the retaining end of the hook slot hinges the plate to the bracket.

11. The removable hinge of claim 10, wherein the hook slot is a U shaped slot with the open end at one end and the retaining end at the other end, and wherein the hook slot is integrated into a wall of the bracket.

12. The removable hinge of claim 10, wherein the plate and the bracket are one of square shaped, rectangular shaped, hexagon shaped, oval shaped and irregular shaped.

13. The removable hinge of claim 10, wherein the hook further comprises a hook arm connecting the pivot pin to the plate, and the stop comprises the hook arm.

14. A camera assembly comprising:
a device housing for housing electronic devices;
a device section coupled to the device housing;
a mounting section coupled to the device section;
a mounting plate coupled to the mounting section;
a bracket coupled to the mounting plate over a removable hinge; and
a stop to limit the mounting plate, hinged to the bracket, from opening beyond an angle of approximately 90 degrees,
wherein the removable hinge comprises
a hook slot on the bracket, the hook slot having an open end and a retaining end; and
a hook on the mounting plate where the hook fits into the open end of the hook slot and the hook slides along the hook slot to the retaining end;
wherein the mounting plate is in a hanging position when the hook is at the retaining end of the hook slot,
wherein the mounting plate is removable from the bracket by sliding the hook from the hook slot out of the open end,
wherein the hook comprises a pivot pin, the pivot pin in the retaining end of the hook slot hinges the mounting plate to the bracket.

15. The camera assembly of claim 14, wherein the hook slot is a U shaped slot with the open end at one end and the retaining end at the other end, and wherein the hook slot is integrated into a wall of the bracket.

16. The camera assembly of claim 14, wherein the mounting plate and the bracket are one of square shaped, rectangular shaped, hexagon shaped, oval shaped and irregular shaped.

17. The camera assembly of claim 14, wherein the hook further comprises a hook arm connecting the pivot pin to the mounting plate, and the stop comprises the hook arm.

18. The camera assembly of claim 14, wherein the bracket is for mounting to a wall and the device housing is shaped such that the stop prevents the device housing from hitting the wall.

* * * * *

UNITED STATES PATENT AND TRADEMARK OFFICE
CERTIFICATE OF CORRECTION

PATENT NO. : 10,248,008 B2  
APPLICATION NO. : 15/405907  
DATED : April 2, 2019  
INVENTOR(S) : Ross Allen Mitchell and Sudeep Mohan Page 1 of 3

It is certified that error appears in the above-identified patent and that said Letters Patent is hereby corrected as shown below:

In the Specification
Column 1, Line 60, "hook on opposite" should read --hook on an opposite--.
Column 2, Lines 9-10, "and wherein the second hook" should read --and the second hook--.
Column 2, Line 12, ", and wherein the hook slots" should read --, and the hook slots--.
Column 2, Line 13, "comprises" should read --comprise--.
Column 2, Line 16, "slot are aligned" should read --slot, respectively, are aligned--.
Column 2, Lines 34-35, "hook on opposite" should read --hook on an opposite--.
Column 2, Line 52, "and wherein the second" should read --and the second--.
Column 2, Line 54, "and wherein the hook slots" should read --and the hook slots--.
Column 2, Lines 55-56, "may comprises" should read --may comprise--.
Column 2, Line 58, "hook slot are aligned" should read --hook slot, respectively, are aligned--.
Column 3, Line 23, "wherein the second" should read --the second--.
Column 3, Line 25, "and wherein the hook slots" should read --and the hook slots--.
Column 3, Line 29, "hook slot are aligned" should read --hook slot, respectively, are aligned--.
Column 3, Line 43, "comprising" should read --comprises--.
Column 3, Lines 48-49, "hook on opposite" should read --hook on an opposite--.
Column 3, Lines 65-66, "and wherein the second" should read --and the second--.
Column 4, Line 1, "and wherein the hook slots" should read --and the hook slots--.
Column 4, Line 5, "hook slot are aligned" should read --hook slot, respectively, are aligned--.
Column 4, Lines 25-26, "and wherein the hook slot" should read --and the hook slot--.
Column 4, Line 41, "comprising" should read --comprises--.
Column 4, Lines 51-52, "and wherein the hook slot" should read --and the hook slot--.
Column 5, Line 53, "description is intended" should read --description are intended--.
Column 5, Line 66, "having device housing" should read --having a device housing--.
Column 6, Lines 3-4, "Embodiments herein and are" should read --Embodiments herein are--.
Column 6, Line 40, "assembly to a surface" should read --assembly 100 to a surface--.
Column 6, Lines 62-63, "articulating 106" should read --articulating arm 106--.
Column 7, Line 11, "comprising" should read --comprises--.
Column 7, Line 13, "comprising" should read --comprises--.
Column 7, Line 21, "Bracket" should read --bracket--.

Signed and Sealed this
Third Day of December, 2019

Andrei Iancu
*Director of the United States Patent and Trademark Office*

Column 7, Line 41, "pivots" should read --pivot--.
Column 7, Lines 48-49, "section 1124" should read --section 124--.
Column 8, Line 12, "section 108" should read --section 124--.
Column 8, Line 15, "edge 430 and the outer edge 420," should read --edge 430, the outer edge 420,--.
Column 8, Line 16, ", the diameter of the ring" should read --, and the diameter of the ring--.
Column 8, Line 16, "410, increases or decreases" should read --410 increase or decrease--.
Column 8, Line 32, "can not" should read --cannot--.
Column 8, Line 48, "6 and 7;" should read --6 and 7,--.
Column 9, Line 4, "edge 730 and the outer edge 720," should read --edge 730, the outer edge 720,--.
Column 9, Line 5, ", the diameter of the ring" should read --, and the diameter of the ring--.
Column 9, Line 5, "410, increases or decreases" should read --410 increase or decrease--.
Column 9, Line 21, "can not" should read --cannot--.
Column 9, Line 35, "arm permitting wire" should read --arm 106 permitting wire--.
Column 9, Line 38, "articulating arm" should read --articulating arm 106--.
Column 9, Lines 40-41, "ring 710 and that the mounting swivel joint 128 is same size" should read --ring 710 and the mounting swivel joint 128 is the same size--.
Column 9, Line 51, "mounting plate with" should read --mounting plate 104 with--.
Column 9, Line 52, "comprising" should read --comprises--.
Column 9, Line 54, "comprising" should read --comprises--.
Column 9, Line 55, "comprising" should read --comprises--.
Column 9, Line 57, "pin 635 each having" should read --pin 635 each has--.
Column 9, Lines 60-61, "8D; there is respectively" should read --8D, there are respectively--.
Column 9, Line 64, "comprising" should read --comprises--.
Column 9, Line 65, "810 on a first" should read --810 is on a first--.
Column 9, Lines 66-67, "slot 820 on a second" should read --slot 820 is on a second--.
Column 10, Line 3, "820 each having" should read --820 each has--.
Column 10, Lines 6-7, "the other end and wherein the second hook" should read --the other end and the second hook--.
Column 10, Line 27, "The camera assembly may" should read --The camera assembly 100 may--.
Column 10, Line 37, "by the stop blocks" should read --by the stop blocks 222, 224, 324, 524--.
Column 10, Line 40, "360 degrees from its normal position" should read --360 degrees from their normal positions.--.
Column 10, Line 52, "The first hook 610 on one side" should read --The first hook 610 is on one side--.
Column 10, Line 53, "and a second hook on opposite side" should read --and a second hook is on an opposite side--.
Column 10, Lines 53-54, "mounting plate 104 where the first hook 810 fits" should read --mounting plate 104. The first hook 610 fits--.
Column 10, Line 55, "second hook 820" should read --second hook 620--.
Column 11, Line 6, "into place using screws" should read --into place by screwing screws--.
Column 11, Line 13, "The first hook 610 with the" should read --The first hook 610 is with the--.
Column 11, Line 14, "hook 620 with" should read --hook 620 is with--.
Column 11, Lines 14-15, "pivot pin 635, the first pivot" should read --pivot pin 635, and the first pivot--.
Column 11, Line 22, "The angle being" should read --The angle is--.
Column 11, Line 25, "has been mounted thereto" should read --has been mounted.--.

CERTIFICATE OF CORRECTION (continued)
U.S. Pat. No. 10,248,008 B2

Column 11, Line 28, "swing" should read --swinging--.
Column 11, Lines 32-33, "degrees in angle;" should read --degrees.--.
Column 11, Line 35, "FIG. 11 where the camera" should read --FIG 11. In FIG. 11, the camera--.
Column 11, Line 37, "wall or ceiling: a wiring cable" should read --wall or ceiling in a wiring cable--.
Column 11, Line 56, "There is shown" should read --There are shown--.
Column 11, Line 62, "hexagon" should read --hexagonal--.
Column 12, Lines 3-4, "for mating with corresponding one hook slot and one hook on the bracket" should read --for mating with one hook slot and one hook on the bracket, respectively.--.
Column 12, Line 5, "perspective of a hex" should read --perspective view of a hex--.
Column 12, Lines 7-8, "embodiment having hexagon" should read --embodiment having a hexagon--.
Column 12, Line 9, "having a hex" should read --has a hex--.
Column 12, Line 9, "hook 1310, the hex" should read --hook 1310 and the hex--.
Column 12, Line 9, "comprising" should read --comprises--.
Column 12, Line 10, "arms being integrated" should read --arms integrated--.
Column 12, Line 11, "The side view being viewed" should read --The side view is viewed--.
Column 12, Line 17, "comprising" should read --comprises--.
Column 12, Line 17, "having" should read --has--.
Column 12, Line 22, "the same the T" should read --the same as the T--.
Column 12, Line 26, "comprising" should read --comprises--.
Column 12, Lines 26-27, "slot 1520 on a first side with" should read --slot 1520 with--.
Column 12, Line 44, "depicted as square" should read --depicted as a square--.
Column 12, Line 49, "herein have particularly" should read --herein are particularly--.
Column 12, Line 52, "camera assembly being attached" should read --camera assembly 100 being attached.--.
Column 12, Line 53, "camera assembly with the" should read --camera assembly 100 with the--.
Column 12, Lines 56-57, "The camera assembly can then be" should read --The camera assembly 100 can then be--.